United States Patent [19]

Ohno et al.

[11] Patent Number: 5,410,532
[45] Date of Patent: Apr. 25, 1995

[54] METHOD FOR A ADJUSTING A BEAM SPLITTER IN AN OPTICAL RECORDING AND REPRODUCING APPARATUS

[75] Inventors: Masahiro Ono; Tsuyoshi Itoho; of Tokyo, Japan

[73] Assignee: Asahi Kogaku Kogyo Kabushiki Kaisha, Tokyo, Japan

[21] Appl. No.: 142,047

[22] Filed: Oct. 28, 1993

Related U.S. Application Data

[62] Division of Ser. No. 920,924, Jul. 28, 1992, Pat. No. 5,317,144, which is a division of Ser. No. 574,071, Aug. 29, 1990, Pat. No. 5,157,459.

[30] Foreign Application Priority Data

| Aug. 29, 1989 | [JP] | Japan | 1-225625 |
| Aug. 29, 1989 | [JP] | Japan | 1-225626 |
| Aug. 29, 1989 | [JP] | Japan | 1-225629 |
| Aug. 29, 1989 | [JP] | Japan | 1-225630 |
| Oct. 2, 1989 | [JP] | Japan | 1-258119 |

[51] Int. Cl.$^6$ ............ G11B 7/00; G01J 1/20; G01B 11/26
[52] U.S. Cl. ............ 369/112; 359/629; 250/201.5; 356/138
[58] Field of Search ............ 250/201.5, 201.7, 201.8; 369/44.14, 44.15, 44.23, 44.25, 44.41, 44.42, 112, 119, 249, 110, 109; 359/629, 637, 638, 639; 356/138

[56] References Cited

U.S. PATENT DOCUMENTS

| 4,355,871 | 10/1982 | Nevyas et al. | 356/376 |
| 4,379,633 | 4/1983 | Bickel et al. | 356/359 |
| 4,530,602 | 7/1985 | Pomphrey, Jr. | 356/138 |
| 4,553,229 | 11/1985 | Wakamiya | 369/112 |
| 4,625,315 | 11/1986 | Lemberger et al. | 372/38 |
| 4,626,673 | 12/1986 | Straye | 250/201.5 |
| 4,639,586 | 1/1987 | Fender et al. | 280/201.9 |
| 4,660,978 | 4/1987 | Wu | 356/353 |
| 4,682,025 | 7/1987 | Livingston et al. | 250/201.9 |
| 4,822,151 | 4/1989 | Tatsuno et al. | 359/495 |
| 4,998,284 | 3/1991 | Bacus et al. | 358/101 |
| 5,033,828 | 7/1991 | Haruta | 369/110 |
| 5,055,663 | 10/1991 | Morimoto et al. | 250/201.4 |
| 5,099,470 | 3/1992 | Matsubayashi | 369/112 |
| 5,115,420 | 5/1992 | Finkelstein et al. | 369/112 |
| 5,159,587 | 10/1992 | Kibune | 369/44.14 |

FOREIGN PATENT DOCUMENTS

61-09015  5/1986  Japan .
62-3434   1/1987  Japan .

*Primary Examiner*—Aristotelis M. Psitos
*Assistant Examiner*—Nabil Hindi
*Attorney, Agent, or Firm*—Sandler, Greenblum & Bernstein

[57] ABSTRACT

A method of adjusting a beam splitter of an optical information recording/reproducing apparatus is provided. The optical information recording/reproducing apparatus includes a laser light source, an objective optical system for converging the light beam from the laser light source, a guide rail mechanism for moving the objective optical system, a beam splitter mounted in an optical path of the light beam parallel to the transfer direction and photodetectors for detecting the light beam split by the beam splitter. The method of adjusting the beam splitter includes supporting a supplementary laser source for emitting a laser beam on the guide rail mechanism so that the laser beam of the supplementary laser source is incident onto the beam splitter along the optical path. The method further includes adjusting the beam splitter, while observing the split laser beam from the beam splitter at plural points where the photodetectors are to be mounted.

12 Claims, 19 Drawing Sheets

METHOD FOR A ADJUSTING A BEAM SPLITTER IN AN OPTICAL RECORDING AND REPRODUCING APPARATUS

This application is a division of application number 07/920,924, filed Jul. 28, 1992, now U.S. Pat. No. 5,317,144 which is a division of 07/574,071, filed Aug. 29, 1990, which issued as U.S. Pat. No. 5,157,459 on Oct. 20, 1992.

BACKGROUND OF THE INVENTION

1. Field of the Invention

The present invention relates to a wave front aberration measuring apparatus for obtaining a spot image by focusing a laser beam from a laser source through an imaging lens, for use in an optical disk apparatus or a laser beam printer, for example, and more particularly to an apparatus for measuring astigmatism and coma aberration.

2. Description of the Prior Art

An optical system of a magneto-optical disk apparatus, for example, is one type of optical system as mentioned above. This optical system focuses a laser beam from a laser source upon the disk by an objective optical system, records information on the disk and reproduces information from the disk. A laser flux must be focused on the disk in a spot as small as the diffraction limit or so, in order to record and reproduce the information accurately. Additionally, the astigmatism or the coma aberration of the laser beam focused upon the disk must be reduced to be as small as possible.

When the wave front of the laser beam made incident into the disk has astigmatism, a focusing position in the vertical plane and a focusing position in the horizontal plane result in separation and the laser beam can not be sufficiently focused. Also, when the central axis of the laser beam is inclined relative to the optical axis of the objective optical system, a coma aberration will occur and the spot upon the disk will enlarge.

Accordingly, this kind of optical system requires both the measurement of the astigmatism and coma aberration of the beam entered into an object and correction of each aberration based on such measurement.

Japanese Patent Laid-open Publication No. SHO 61-109015 discloses the conventional correction method of astigmatism. The method mentioned in the Publication is that the wave front of a light beam having an astigmatism emitted from a laser diode is corrected before being made incident on an objective optical system by an anamorphic optical system.

However, an astigmatism generated by optical elements placed between the anamorphic optical system and the disk can not be eliminated by only the correction of an astigmatism of the light beam through the anamorphic optical system. In order to completely eliminate the astigmatism of the beam focused on the disk, the aberration generated by the optical element must be reduced. Since very high accuracy is required to make these optical elements placed between the anamorphic optical system and the disk, the costs of making them are great. The flattening of a mirror especially requires a very high accuracy because a mirror of low flatness (i.e., not precisely flat) generates a large astigmatism.

The conventional method for measuring the inclination of a central axis of a light beam and an optical axis of an objective optical system to measure a coma aberration is that a beam of a He-Ne laser, for example, is first made incident into an objective optical system perpendicularly to an optical disk, and then the beams reflected by each surface of the lenses comprising an objective optical system are interfered, and next the interference fringes are projected onto the screen, and finally the inclination of the objective optical system is measured.

However, in the conventional inclination measuring method of an objective optical system, the inclination of the optical axis of an objective optical system can not be measured with high accuracy because interference fringes occur by superposing all beams reflected from each surface of the lenses comprising the objective optical system, and the inclination or the dislocation of the axes of the lenses affects the interference fringes. Additionally, since this method requires a He-Ne laser apparatus, etc., its cost is large, when used as a single-purpose method of measuring an inclination.

With regard to the measurement of a coma aberration, a highly accurate analysis can be gained by computerizing an interference fringe using an interferometer such as ZYGO 8100 (a trade name of ZYGO Co. Ltd.). This method not only costs much but also can not obtain a real time result of the measurement. Therefore, it has been difficult to adjust the inclination of an objective optical system and at the same time to confirm the result of the measurement.

SUMMARY OF THE INVENTION

The present invention seeks to overcome the above deficiencies. One object of the invention is to provide an apparatus for measuring an astigmatism with high accuracy.

Another object of the invention is to provide a method for correcting an astigmatism despite the accuracy of finish of optical elements.

Still another object of the invention is to provide a measuring apparatus, in which a inclination of an objective optical system can be adjusted while a coma aberration of a light beam focused upon a disk is being measured with high accuracy.

DETAILED DESCRIPTION OF THE EMBODIMENTS

The embodiments of the present invention will now be described hereinafter with reference to the drawings.

First, an optical system of a magneto-optical disk apparatus as an example of a measuring object will be described, and second, five embodiments of a wave front aberration measuring apparatus will be described.

Figure 1:
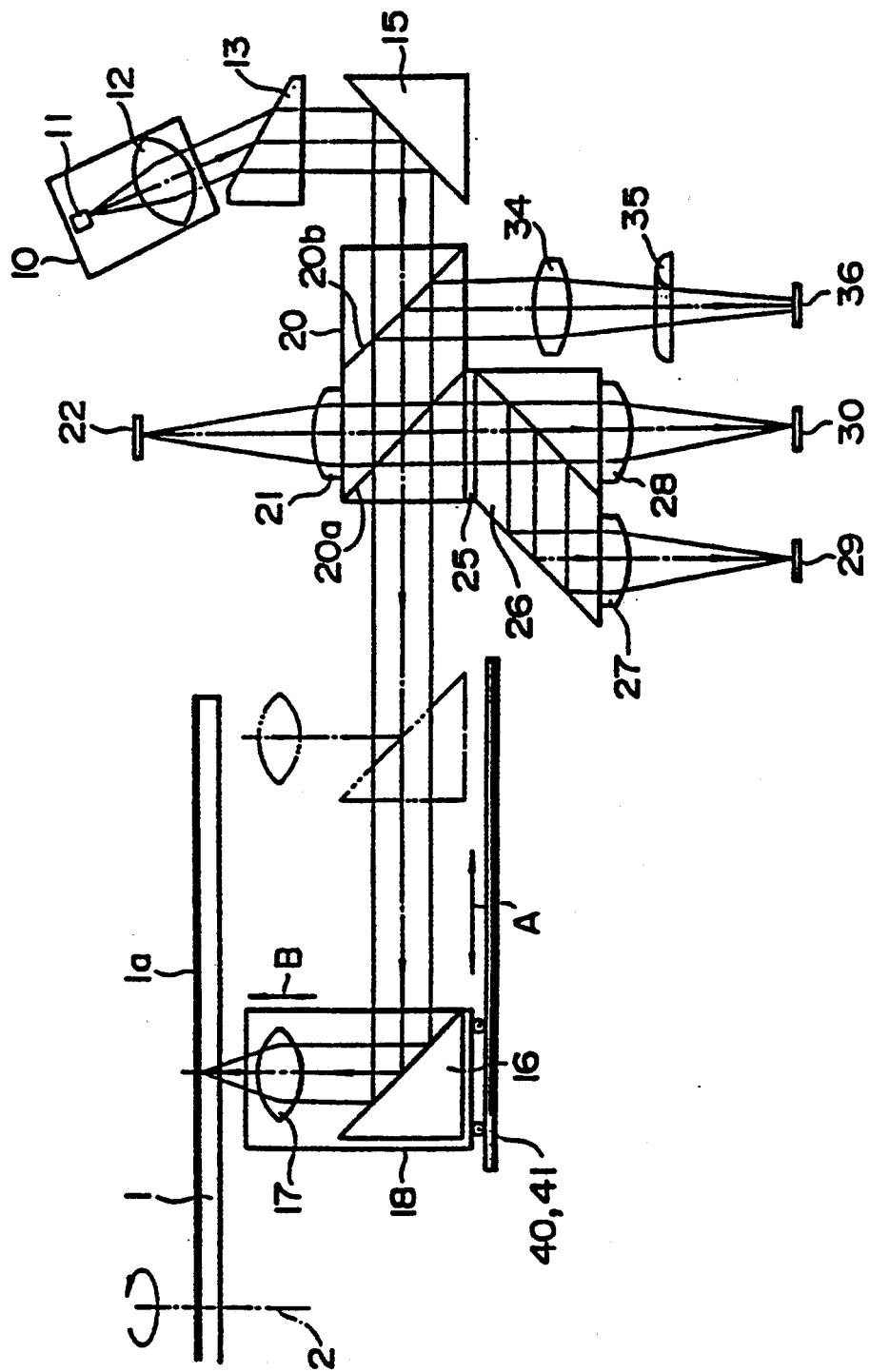
FIG. 1 is a schematic view showing a magneto-optical disk apparatus as a measuring object of the present invention.

FIG. 1 shows an optical system of an optical information recording and reproducing device. A magneto-optical disk 1, serving as an information storage medium, is rotatable on an axis 2. A laser beam is applied to a magnetic thin film 1a formed on the upper surface of the magneto-optical disk 1, so as to change the direction of magnetization of that portion of the magnetic thin film 1a on which a spot (pit) of the laser beam is formed, thereby storing digital information.

While this approach enables information to be written and read easily, it is necessary to focus the laser beam accurately into a spot of about 1 μm diameter on the magnetic thin film 1a of the magneto-optical disk 1.

A laser pen 10 contains a laser diode (LD) 11 and a collimator lens 12. The laser diode 11 emits a divergent oval-shaped laser beam. The collimator lens 12 forms the laser beam, emitted from the laser diode 11, into a beam of parallel rays, and a light-emitting point of the laser diode 11 is disposed in the vicinity of the focal point of the collimator lens 12.

The incident oval-shaped laser beam is refracted by an anamorphic prism 13 only in a direction parallel to the junction surface of the laser diode 11 (i.e., in the direction of the plane of the sheet of FIG. 1) and is enlarged, so that a laser beam with a circular cross-section exits from the anamorphic prism 13.

A fixed mirror 15 and a movable mirror 16 are disposed so as to be opposed to each other. The laser beam passing through the anamorphic prism 13 is reflected by the fixed mirror 15 and is then reflected by the movable mirror 16. The reflected beam then passes through an objective lens 17, so that the laser beam is focused on the magnetic thin film 1a of the magneto-optical disk 1.

Figure 2:
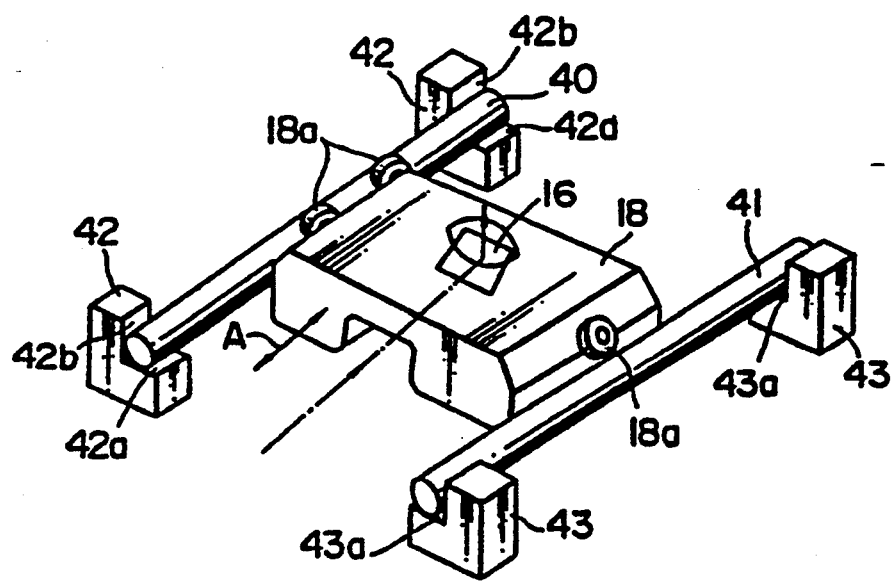
FIG. 2 is a perspective view showing the connection between guide rails and a carriage of the apparatus of FIG. 1.

The movable mirror 16 and the objective lens 17 are integrally mounted on a carriage 18. In FIG. 2, the carriage 18 is supported by a standard guide rail 40 and an auxiliary guide rail 41 which are spaced apart, are parallel to each other, and is movable in the radial direction of the disk. The carriage 18 has two wheels 18a in contact with the standard guide rail 40 and one wheel 18a with the rail 41. The standard guide rail 40 is detachably positioned on mounts 42 fixed to the base (not shown), the auxiliary guide rail 41 being positioned on mounts 43. The mounts 42 comprise a horizontal surface 42a contiguous to the lower part of the guide rail and a vertical surface 42b contiguous to the side part of the rail. And in the same manner, the mount 43 comprises a horizontal surface 43a and a vertical surface 43b.

By the above-mentioned configurations, since the carriage 18 can move in the radial direction of the disk, the beam spot focused by the objective lens 17 can gain access to the disk 1 in order to reproduce information from optical track of the disk.

A beam splitter 20 is fixed between the fixed mirror 15 and the movable mirror 18. The beam entering the beam spitter 20 from the side of the fixed mirror 15 is split by a first half-mirror surface 20a, and is passed through a first condenser lens 21 to be focused on a first photoelectric element 22 for monitoring a laser output.

The beam passing through the beam splitter 20 and reflected by the magneto-optical disk 1 is returned to the beam splitter 20. The beam split by the first half-mirror surface 20a passes through a half wavelength plate 25, and the direction of the polarizing plane is turned by 45°. Then, using an auxiliary beam splitter 26, the beam is split further by a polarizing reflecting surface disposed at an angle of 45° with respect to the polarizing direction, so that the beams pass respectively through second and third condenser lenses 27 and 28 and are focused respectively on a second photoelectric element 29 for S-polarized intensity detection, and on a third photoelectric element 30 for P-polarized intensity detection. Reading of the information is performed by output signals of the second and third photoelectric elements 29 and 30.

The reflected beam, which is reflected by the magneto-optical disk 1 and split by another half-mirror surface 20b of the beam splitter 20, passes through a fourth condenser lens 34 and a cylindrical lens 35, and is focused on a fourth photoelectric element 36 which outputs a servo signal for effecting focusing and tracking. The focusing servo causes the objective lens 17 to move finely in a direction B, along an optical axis of the objective lens 17, so that the minimum diameter spot of the laser beam is focused on the surface of the magnetic thin film 1a of the magneto-optical disk 1. The tracking servo causes the objective lens 17 to move finely in a direction A (a radial direction of the magneto-optical disk 1) so as to control the laser beam in such a fashion that the laser beam spot will not become displaced from the track. In this case, a light receiving surface of the fourth photoelectric element 36 is divided, for example, into four or more parts, and the signal for the focusing servo and the tracking servo is obtained by combining signals from the various parts.

Figure 4:
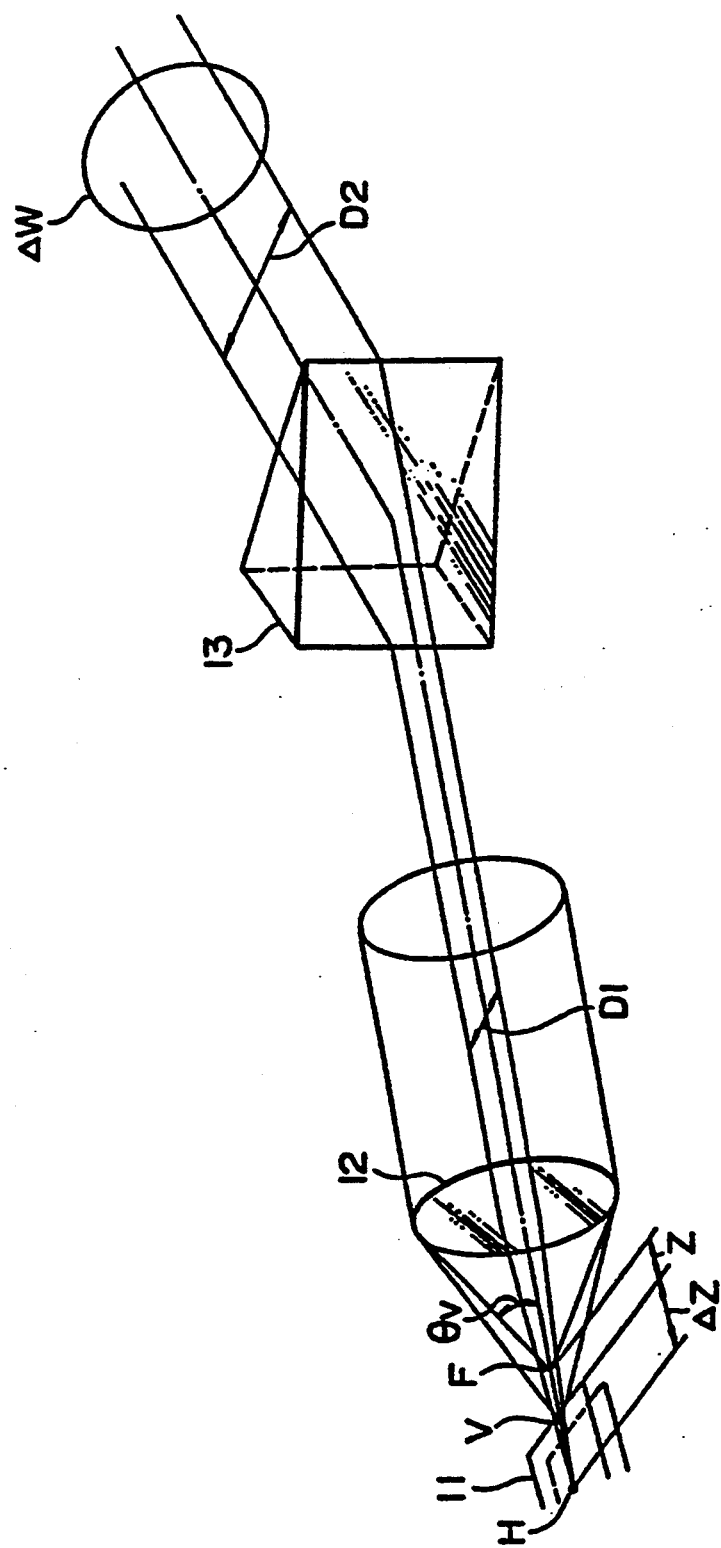
FIG. 4 is an enlarged view of a light source of FIG. 1.

Next, astigmatism, referring to FIG. 4 which is a partially enlarged view of FIG. 1, will be described.

The character H in FIG. 4 designates an light-emitting point in a direction horizontal to a pn-junction plane of a laser diode 11 (hereinafter referred to as horizontal emitting point), and the character V designates an emitting point in a direction vertical to a pn-junction plane (hereinafter referred to as vertical emitting point). The wave front of the laser beam with a circular cross section emitted from an anamorphic prism 13 has defocused wave front aberration amount (hereinafter referred to as defocused) in the horizontal direction to the pn-junction plane and in the vertical direction. These defocuses $\Delta Wh$, $\Delta Wv$ are as follows:

$$\Delta Wh = (Z + \Delta Z)(NA)^2 (2M^2)$$

$$\Delta Wv = Z (NA)^2 / 2$$

wherein $\Delta Z$ is an astigmatic difference of the laser diode (that is a distance between two emitting points H, V)

Z is a distance between the vertical emitting point V and the focal point F of a collimator lens 12

NA is a numerical aperture of a laser beam made incident to the collimator lens 12 in the direction vertical to the pn-junction plane ($NA = \sin\Theta v$)

M is an anamorphic ratio of an anamorphic optical system (that is, the ratio of the maximum magnification to the minimum magnification ($M = D2/D1$)).

Therefore, $\Delta Was$, the wave front aberration amount of an astigmatism (hereinafter referred to as astigmatism) which the wave front of the laser beam emitted from the anamorphic prism 13 has, is:

$$\Delta Was = \Delta Wh - \Delta Wv$$
$$= [\Delta Z + Z(1 - M^2)](NA_2)/(2M^2)$$

Astigmatism as a function of Z is generated between the cross sections horizontal and vertical to the pn-junction plane.

Consequently, $\Delta Was$, an astigmatism which a laser beam has at the position where it exits from the anamorphic prism 13, is adjustable by changing the distance Z between the laser diode 11 and the collimator lens 12.

In the magneto-optical disk apparatus shown in FIG. 1, the distance Z between the laser diode 11 and the collimator lens 12 can be adjusted so as to obtain the following formula:

$$\Delta Was = -\alpha$$

where $\alpha$ is an astigmatism generated by elements placed between the disk 1 and the anamorphic prism 13, that is, a fixed mirror 15, a beam splitter 20, a movable mirror 16 and an objective lens 17. This adjustment of the distance Z can make the astigmatism of the laser beam focused upon the disk zero (0), because the astigmatism $\alpha$ generated by the optical elements which are placed between the disk and the anamorphic prism 13, is offset by the astigmatism $\Delta Was$ upon the position of the laser beam in exiting from the anamorphic prism 13.

Figure 5:
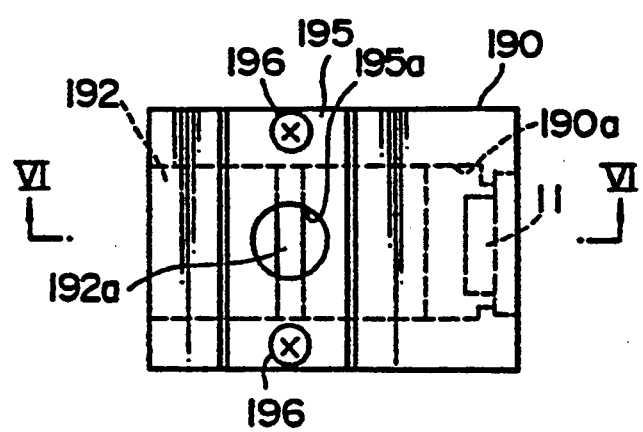
FIG. 5 is a plan view of a laser pen of the apparatus of FIG. 1.
Figure 6:
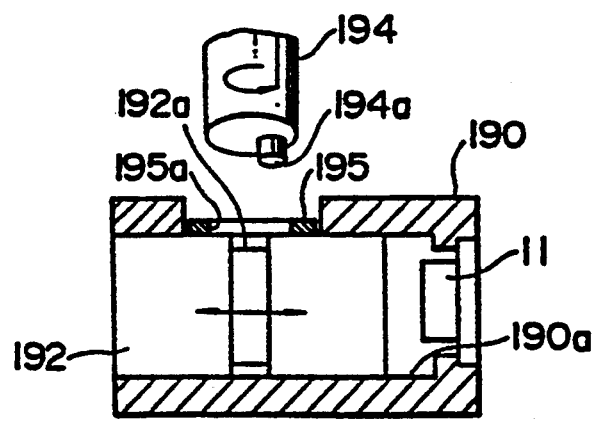
FIG. 6 is a cross sectional view taken along the line VI—VI of FIG. 5.

FIGS. 5 and 6 show one configuration for adjusting the distance or length between the laser diode 11 and the collimator lens 12.

The lens diode 11 is fastened to the edge portion of the hole 190a formed in the casing 190 of the laser pen 10. A lens frame 192 including the collimator lens 12 is slidably disposed inside the hole 190a. A part of the wall of the casing 190 is cut out. A presser plate 195, for fastening the lens frame 192 in the cut-out part, is fastened to the casing by screws 196, 196. A channel 192a is formed on the wall periphery of the lens frame 192. An adjusting hole 195a is formed in the center of the presser plate 196. In adjusting the distance or length between the diode 11 and the lens 12, first the screws are loosened, a cylindrical adjusting rod 194 is inserted into the hole 195a, and then an eccentric pin 194a constituted by the tip of the adjusting rod 194 is meshed with the channel 192a, and the lens frame 192 is slid by rotating the adjusting rod 194 about its axis. After obtaining a distance of desired value, the screws are fastened and the lens frame 192 is fixed to the casing by the presser plate 195.

The correction method mentioned above results in the changing of the distance between the laser diode 11 and the collimator lens 12 breaks the parallel condition of the laser beam emitted from the collimator lens 12. Therefore, the spot of the laser beam focused upon the disk will be moved out of its original position, if the positions of other optical elements are the same as before adjusting. Non-parallel condition of the incident laser beam generates a spherical aberration since the objective lens is designed for highest efficiency in the incidence of the parallel beam. However, the problem of the dislocation of the spot does not matter because the objective lens is automatically moved so that the spot may coincide with the disk plate by the above-mentioned focusing servo. And a small amount of spherical aberration is virtually eliminated.

(1) First embodiment

Figure 7:
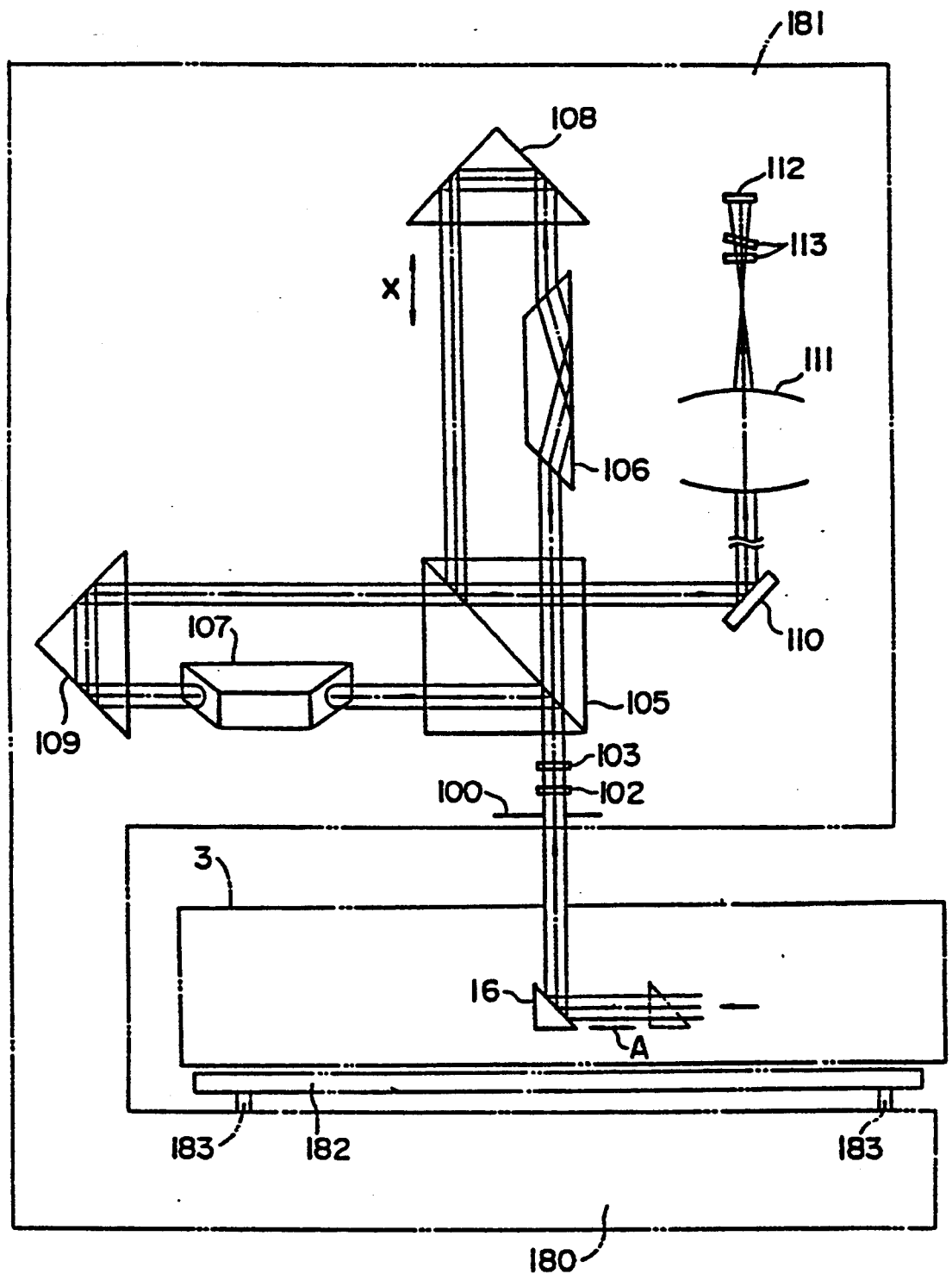
FIG. 7 is a schematic view showing an optical system of a first embodiment of an optical wave front aberration measuring apparatus in accordance with the present invention.

FIG. 7 shows a first embodiment of a wave front aberration measuring apparatus. The apparatus in the embodiment measures an astigmatism of a laser beam as follows: first the laser beam emitted from a measuring object is divided into two beam fluxes, second, these divided beams are rotated relatively by 90°, and then the beams are superposed and interfered, and finally the interference fringes are measured.

The apparatus in FIG. 7 comprises a base 180 for supporting the apparatus, a main body 181 including the optical system, and a table 182 for mounting a measuring object. The table 182 on the base is supported by a telescopic cylinder 183 in order to incline the measuring object.

The character 3 designates an optical system with an objective lens 17 from the optical unit of the magneto-optical disk apparatus serving as an optical system of a measuring object shown in FIG. 1.

The laser beam reflected by a movable mirror 16 has its diameter determined by a diaphragm 100, and the polarization condition and polarization direction of the beam are adjusted by a $\lambda/4$ plate (quarter wavelength plate) 102 and $\lambda/2$ plate (half wavelength plate) 103 which can rotate on the optical axis independently and respectively. The $\lambda/4$ plate 102 serves to convert a circular polarized light into a linearly polarized light, for example, and the $\lambda/2$ plate 103 serves to rotate the direction of a linearly polarized light by 90°. The incident light beam into the magneto optical disk apparatus in FIG. 1 is a linearly polarized light beam, and that in the compact disk apparatus is a circular polarized light beam. Generally, since the reflectivity of a mirror surface of a prism, etc. changes according to the polarization condition of an incident light, the difference in the incident light according to the apparatus, occasionally causes a quantitative unbalance of the divided light beams. A constant quantity of the laser beam is maintained by the adjusting of the wavelength plates 102, 103.

The laser beam passing through the λ/2 plate 103 is divided into two beam fluxes by a beam splitter 105. One flux, passing through the splitter 105 is rotated on the axis in a 45° angle by a first image rotator 106, and then is reflected by a right angle prism 108, and enters into the splitter 105 again. Also, another flux reflected by the splitter 105 is rotated on the axis in a 45° angle by second image rotator 107, and then reflected by a right angle prism 109, and enters into the splitter 105 again.

The image rotators 106 and 107 in this embodiment each utilize the same Dach prism, in shape and characteristics. However, in addition to this configuration, the scope of the invention further includes a configuration of installing an image rotator for rotating a beam about the axis through a 90° angle in only one optical path.

The right angle prisms 108, 109 are rectangular prisms for reflecting the beam emitted from the image rotators both in the opposite directions and parallel. The prisms 108, 109 both have the same function in order to obtain a high coherence. At least one prism is slidable in the axial direction so as to change the condition of the interference fringes. In this embodiment, the prism 108 is slidable in the axial direction as illustrated by an arrow X in FIG. 7.

The two beams entering again into the beam splitter 105 have been rotated relatively by 90°, and are superposed, and then interfere with each other, and next enter into an imaging lens 111 via a mirror 110. The lens 111 forms the image of the diaphragm 100 on an image sensor 112 such as a CCD image sensor. The output of the image sensor, through a picture processing device, is input to a CRT monitor (not shown), for example, which displays the wave front aberration of the beam as interference fringes. Two polarizing filters 113 pivotable rotatably independently about the axis are disposed between the imaging lens ill and the image sensor 112. The rotation of the filters or screens changes the quantity of the beamlight passing to the image sensor 112. Even one polarizing filter can adjust the quantity to some extent. An ND filter can be utilized in place of the polarizing filter. The laser diode 11 of the magneto optical disk apparatus emits the laser beam first, and the beam reflected by the mirror 16 is incident into the splitter 105 for the measurement. The incident beam is divided into two parts, and then rotated relatively about the axis by a 90° angle, are next superposed, and are interfered. The interfered laser beam is imaged on the image sensor 112 by the lens 111.

Figure 8:
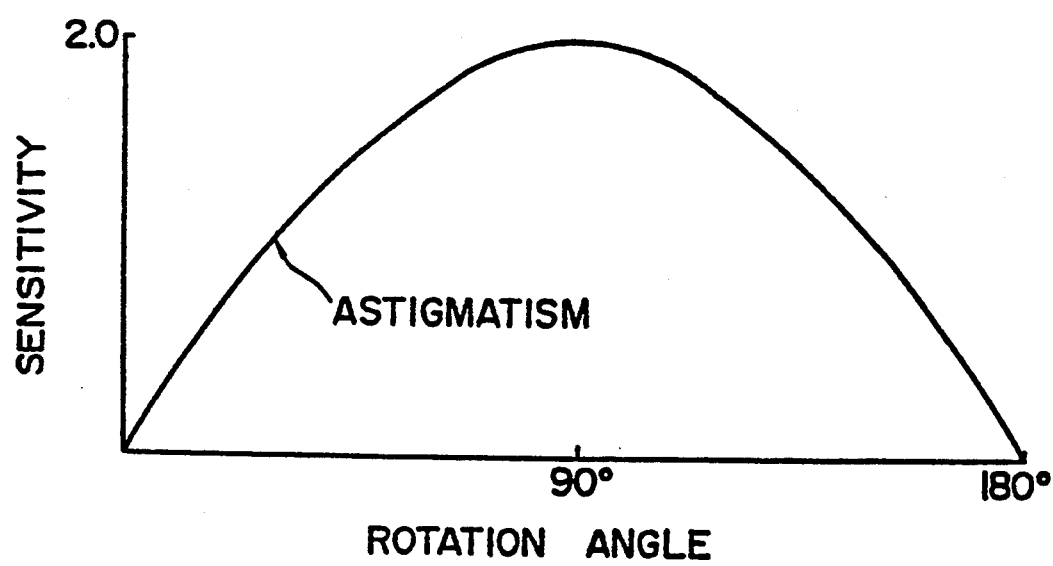
FIG. 8 is a graph showing the relation between the relative rotation angles of the two beam fluxes and a sensitivity of an astigmatism by the interference fringes by the apparatus of FIG. 7.

Next, the signal from the image sensor 112 is displayed on a CRT monitor (not shown). Then, since the table 182 is inclined, optical unit 3 is inclined against the base 180 of the measuring apparatus so that two to four fringes appear on the monitor. Since the interference fringes are formed by two beams rotated relatively about an axis by 90°, an astigmatism or a coma aberration as a component asymmetrical to the axis is detected. But the defocus component can not be detected because of its symmetry with respect to the axis. In other words, an astigmatism can be detected as a curvature difference of a wave front between the two planes perpendicular to each other including the axis, and the effect by the astigmatism is stressed or emphasized by the superposing after rotation of the divided beam relatively by a 90° angle. FIG. 8 shows the relation between the angle of relative rotation of the beam and the sensitivity of the astigmatism in the interference fringes having a maximum at a 90° angle.

When the distance between the collimator lens 12 and the laser diode 11 is being changed so as to eliminate the astigmatism, only the astigmatism, but not the defocus, is detected. And accordingly, it is easier to adjust it over the observation of the interference fringes.

Figure 9A:
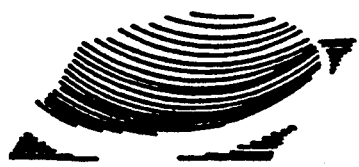
FIGS. 9A through 9C show defocus components of a wave front of a laser beam.
Figure 9B:
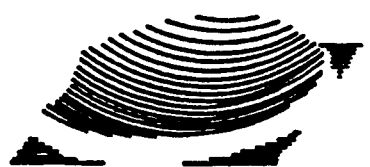
Figure 9C:
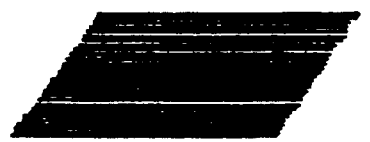

The above relation will be described in reference with FIGS. 9 and 10. Rotation of the beam on the axis does not give an effect to the wave front of the beam including the defocus as a rotationally symmetrical wave front aberration. The wave fronts emitted from the image rotators 106, 107 have the same shape, as shown in FIGS. 9A and 9B. And thus, the difference of the two wave fronts forms a flat surface, which cannot be detected as interference fringes as in FIG. 9C.

Figure 10A:
FIGS. 10A through 10C show components of astigmatism of wave front of a laser beam.
Figure 10B:
Figure 10C:

If the beam includes an astigmatism of a rotationally asymmetrical wave front, the wave front passing through the image rotators 106, 107 will have different directions to each other as in FIGS. 10A, 10B. The difference of the wave fronts after interfering appears as a component curved outwardly and opposite in the two directions perpendicular to each other as in FIG. 10C. In other words, curved interference fringes appear in the case of the astigmatism of the beam, and linear interference fringes appear in the case of the non-astigmatism. If the curved interference fringes appear, the collimator lens 12 must be moved so that the interference fringes may become linear by the correction method mentioned hereinbefore.

According to the above-mentioned measuring method, astigmatism which is generated by elements placed between the laser diode 11 an the movable mirror 16 can be corrected, but astigmatism of the objective lens does not actually matter, because of the astigmatism of the optical elements, including an anamorphic prism 13, and mirrors 15, 16 are apt to be relatively large with respect to that of the objective lens.

Since a lens for converting the convergent beam from an objective lens into the parallel beam is mounted in the measuring apparatus, the measurement of astigmatism including an objective lens can be carried out.

(2) Second embodiment

Figure 11:
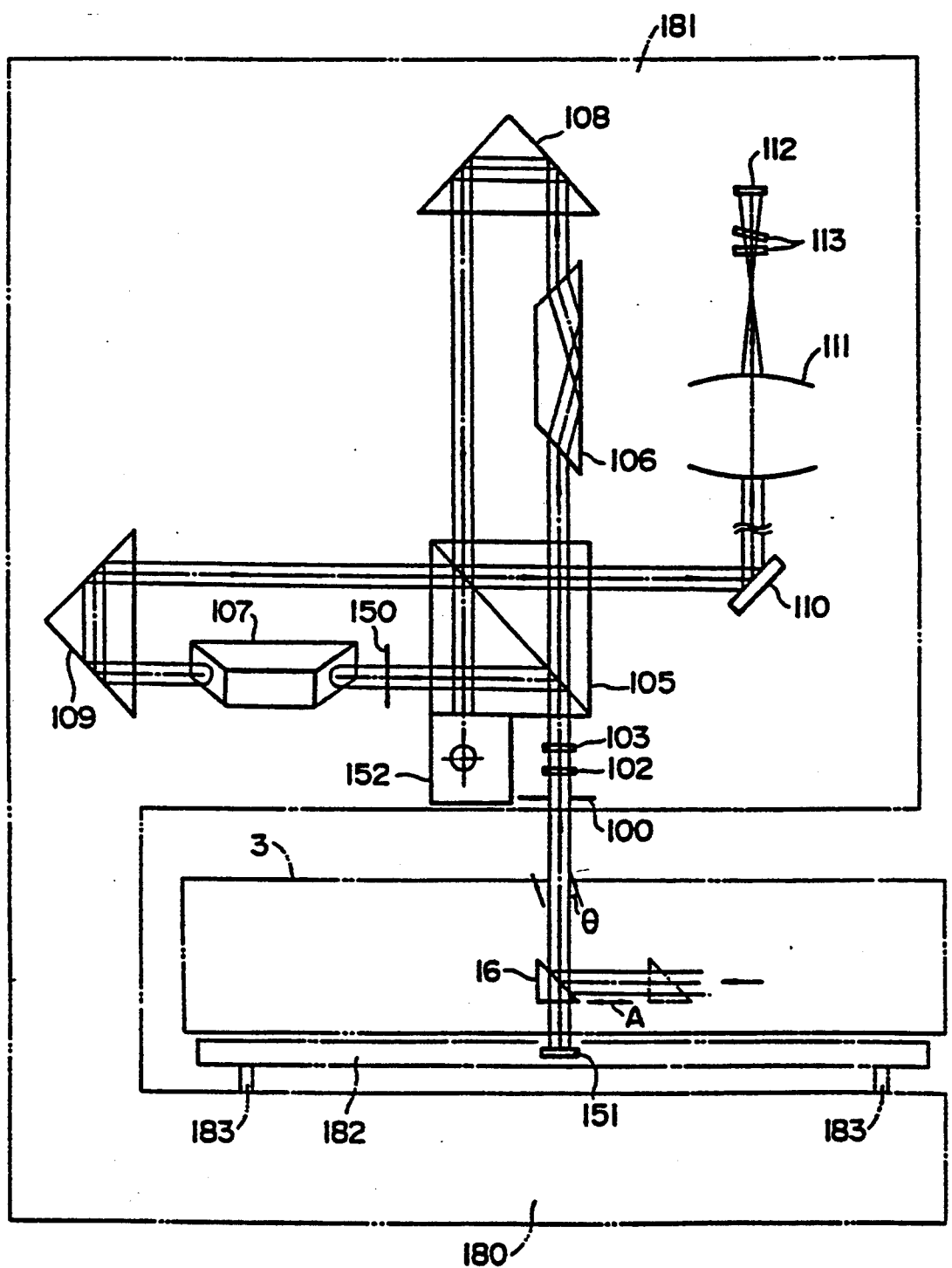
FIG. 11 is a schematic view of an optical system showing a second embodiment of an optical wave front astigmatism measuring apparatus in accordance with the present invention.
Figure 12:
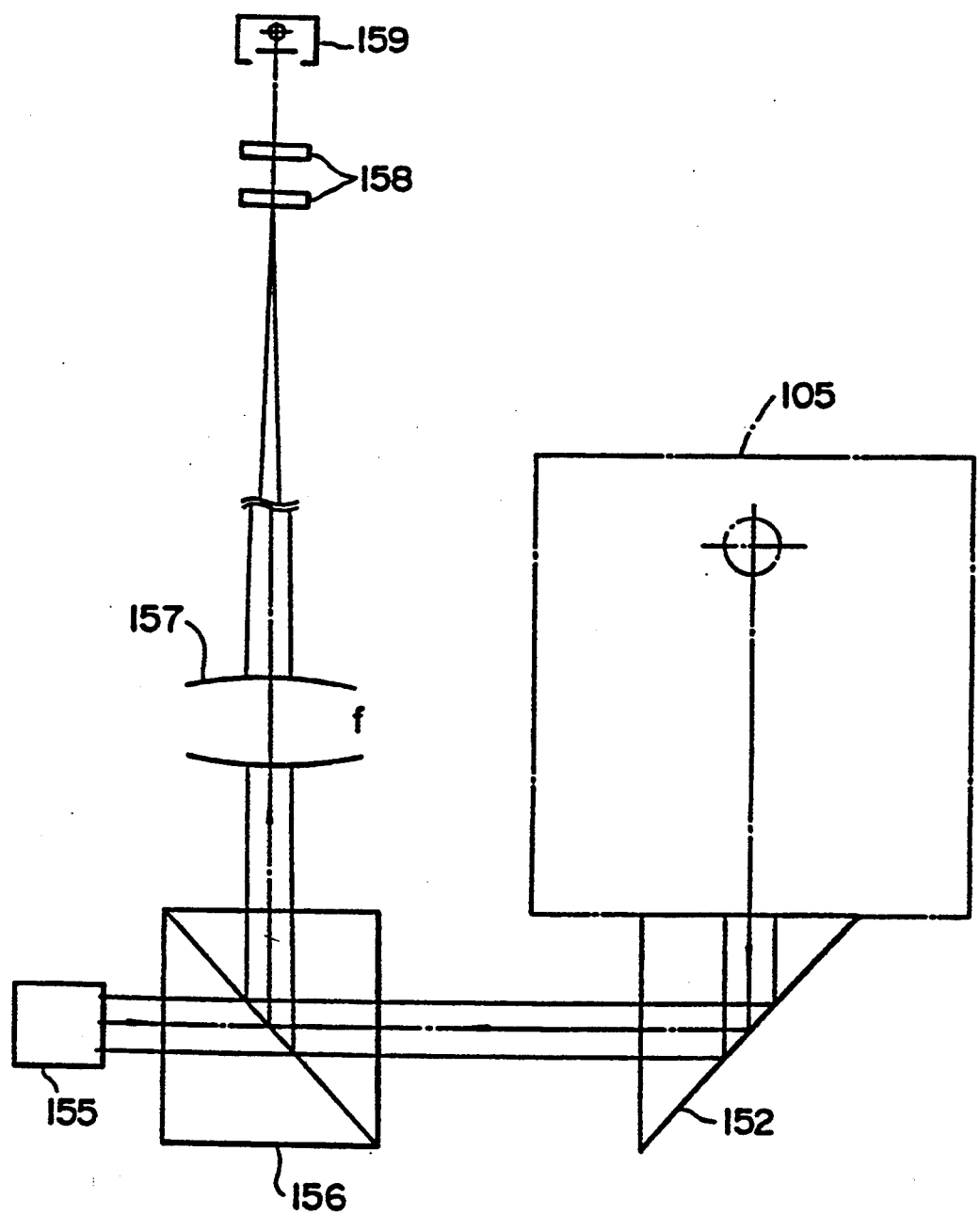
FIG. 12 is an enlarged view of a light source of the apparatus in FIG. 11.

FIGS. 11 and 12 show a second embodiment of the measuring apparatus in accordance with the invention.

The apparatus in the first embodiment mentioned above is used only for measuring a wave front aberration. However a measurements required for enhancing the usefulness of the apparatus, includes not only a wave front aberration but also an intensity distribution, for example.

Conventional measuring apparatus has been used for measuring a single item only (wave front aberration, for example), and plural apparatuses have been needed in proportion to the number of measuring items.

The apparatus in the second embodiment adds to that of the first embodiment, a shutter and means for detecting an inclination of the table, being capable of measuring both a wave front aberration and an intensity distribution. Configurations different from the first embodiment will be described hereinafter.

One difference is the disposition of a shutter 150 in the optical path between the beam splitter 105 and the image rotator 107. The shutter 150 is open for measuring wave front aberration, and closed when measuring an intensity distribution of the laser beam, because measurement of the wave front aberration requires the interference of the two beams, which the measurement of the intensity distribution does not require.

Another difference is the disposition of a device for measuring an inclination of the table 182. The device can detect the inclination of the table 182 such that a beam is incident into a standard mirror 151 mounted on the table 182 and then the beam reflected by the standard mirror 151 is received by the device. The inclination-detecting device comprises a prism 152 mounted on the underside of a beam splitter 105, and a laser beam source 155 for making the beam incident into the prism 152, as in FIG. 12. The beam source 155 comprises a laser diode and a collimator lens.

The inclination of the table 182 can be measured by emitting a laser beam from the beam source 155 before setting an optical unit 3. And the laser beam emitted from the source 155 is transmitted through a second beam splitter 156, and enters into a beam splitter 105 after being reflected by a prism 152. As in FIG. 11, the laser beam transmitted by the half mirror surface of the beam splitter 105, a right angle prism 108, an image rotator 106, and then returns again to the beam splitter 105, and is reflected by the standard mirror 151 mounted on the table 182. The laser beam reflected by the standard mirror 151 reaches a second beam splitter 156 (shown in FIG. 12) through the same path as in the above, and is then reflected by the beam splitter 156, is condensed by a condenser lens 157, and is incident into a TV camera 159 for alignment.

Two polarizing filters are disposed between the condenser lens 157 and the TV camera 159, the same as between an imaging lens 111 and an image sensor 112.

The output of the TV camera 159 is displayed on a CRT monitor (not shown), and light spots or points appear on a screen of the CRT monitor according to the positions of the spots on the image sensor 112. A reference line is drawn at the position where light point appears corresponding to the reference angle of the table on the screen of the CRT monitor, so an operator can adjust the inclination of the table 182 such that the reference line and the light point coincide.

The inclination of the table can be measured with the shutter 150 both open and closed.

The table is first preset at a reference angle. Laser emission from the source 155 is stopped and an optical unit 3 is mounted on the table 182. Next, a laser diode 11 of the unit 3 emits with the shutter 150 closed and a part of the laser beam from the unit 3 transmits through the beam splitter 105, and passes through the image rotator 106 and the right angle prism 108, and again enters into the beam splitter 105. The laser beam made incident from the unit 3 and reflected by the beam splitter 105 is shut-out by the shutter 150. The laser beam passed through the beam splitter 105 is reflected by the prism 152 and the second beam splitter 156, and is condensed on the TV camera 159 by the condenser lens 157. The inclination of the laser beam through the objective lens 17 emitted from the laser diode 11 can be measured by measuring the difference between the reference line and the light point on the CRT.

The incident angle Θ (rad.) of the laser beam into the objective lens 17 is:

Θ=R/f where f is the focal length of the condenser lens 157, R is the distance on TV camera 159 between the convergent point and a center point where the light is converged in case of Θ=0.

The laser beam reflected by the beam splitter 105 is reflected by the mirror 110, and finally forms an image on the image sensor 112 by the imaging lens 111. The intensity distribution of the laser beam can be measured by displaying the output of the image sensor 112 on the CRT monitor.

The measurement of the wave front aberration is carried out by emitting light from the laser diode 11 with the shutter 150 open. The same procedure as in the first embodiment is followed, and the astigmatism of the laser beam can be measured.

Both a wave front aberration and an intensity distribution can be measured by the same apparatus in the second embodiment.

(3) Third embodiment

Figure 13:
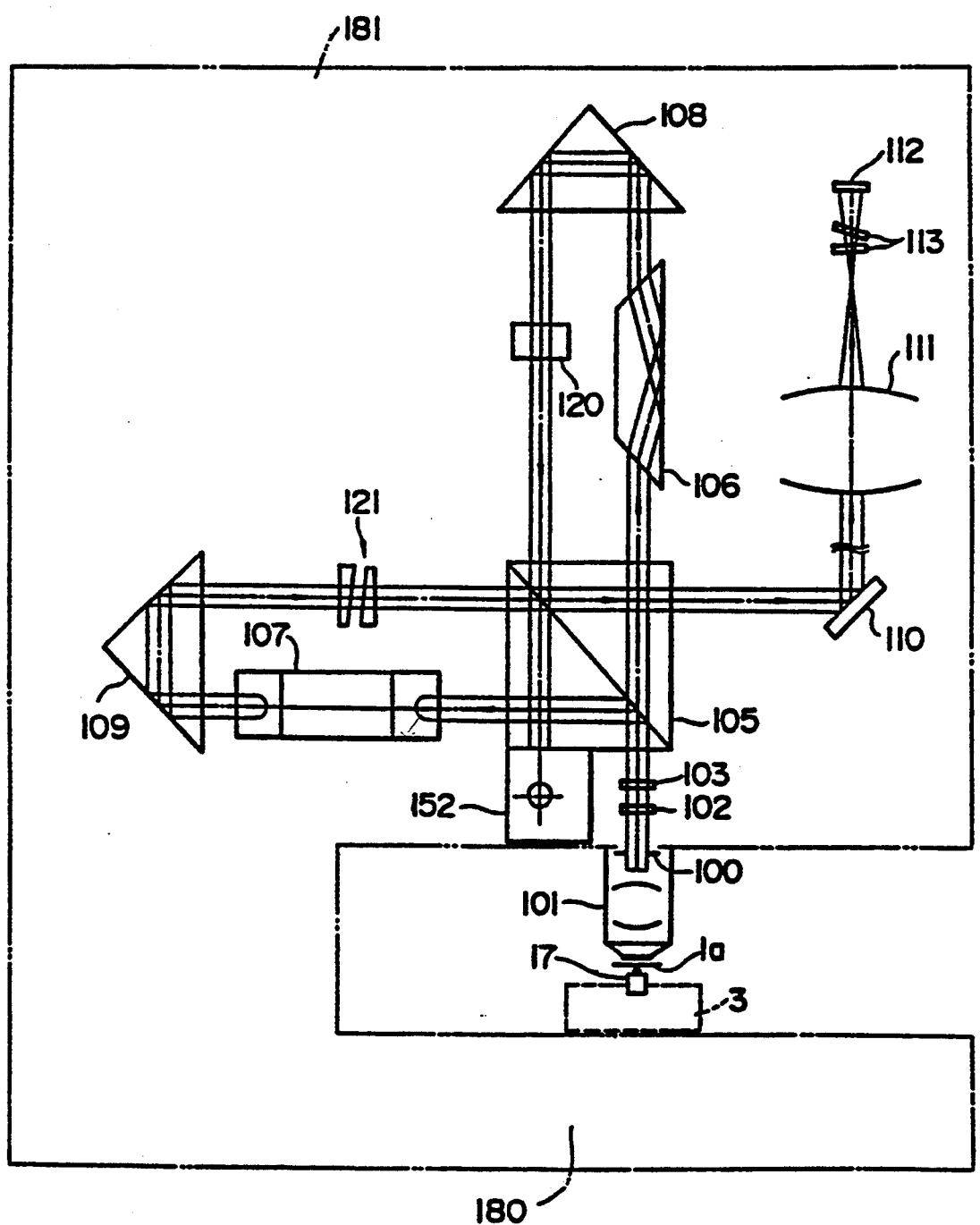
FIG. 13 is a schematic view of an optical system showing a third embodiment of an optical wave front astigmatism measuring apparatus in accordance with the present invention.
Figure 14:
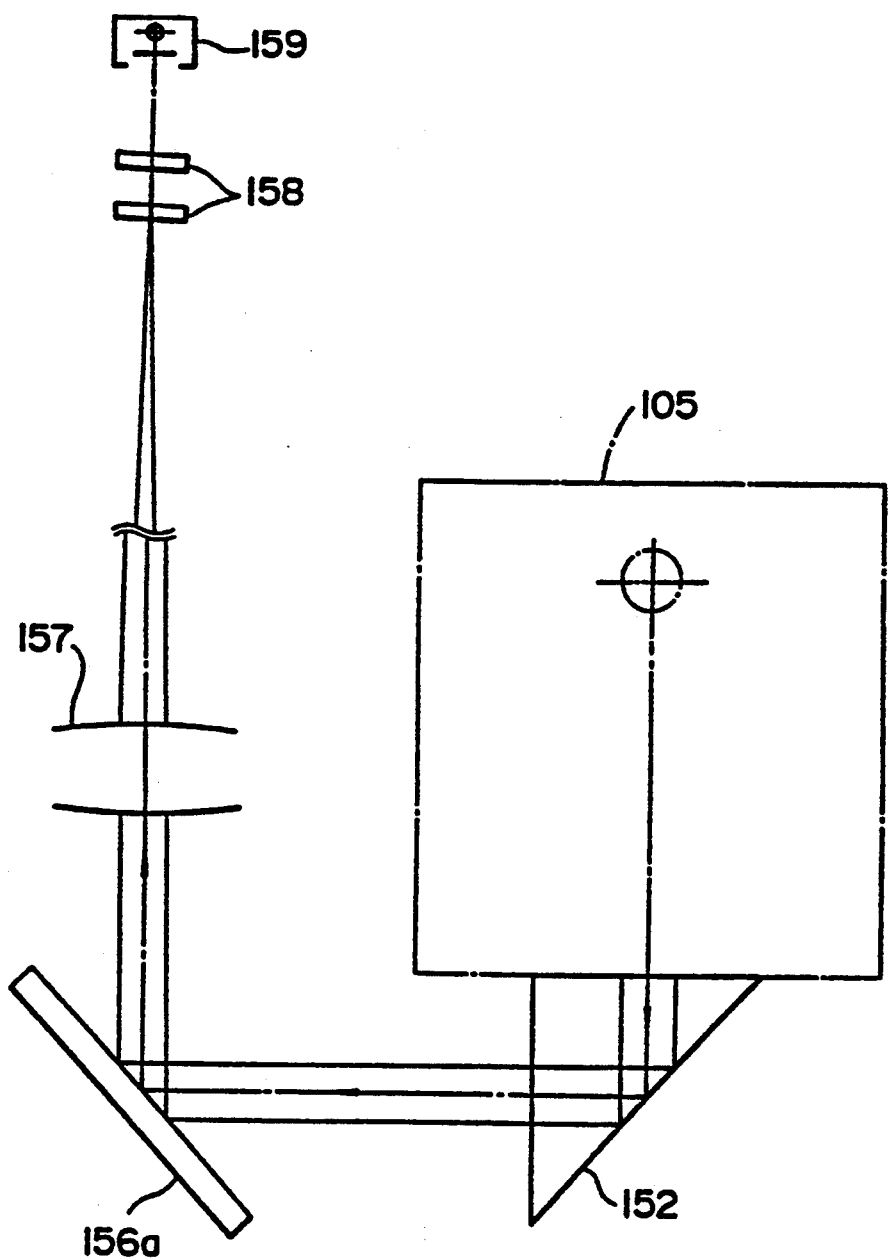
FIG. 14 is an enlarged view of a light source of the apparatus in FIG. 13.

FIGS. 13 and 14 show a third embodiment of the invention. The third embodiment relates to the measurement of a coma-aberration components of a wave front aberration.

The configuration of a measuring apparatus in the third embodiment is similar to that in the second embodiment, so the difference between the two will be described.

First, is the disposition of the objective lens 101 in the apparatus. The objective lens 101 serves to convert the convergent beam flux emitted from the objective lens 17 of the optical unit 3 as a measuring object into a parallel beam flux. The diaphragm 100 is disposed at the position of the exit pupil of the objective lens 101.

Second, is that the relative angle of rotation of the beam flux by the image rotators 106, 107 are preset at 180°.

Third, is the disposition of an optical parallel plate 120 between the right angle prism 108 and a beam splitter 105, and two wedge prisms 121 between the right angle prism 109 and the beam splitter 105. The wedge prisms 121 disposed rotatably about the optical axis can serve to incline the beam flux divided by the beam splitter 105. The inclination of one laser beam produces an optical tilt to the interference fringes for observing. The optical parallel plate 120, which is the same material and thickness as two wedge prisms 121, is positioned in the optical path, so as to equalize the distance of the two optical paths.

Fourth, is the absence of the table 182 for inclining the optical unit 3. The optical axis of the measuring apparatus is perpendicular to the top surface of the base 180.

Fifth, is the absence of the beam source 155, and the disposition of a mirror 156a instead of the beam splitter 156, as shown in FIG. 14. A transmission type optical disk or a transparent glass plate 1a, having an optical path length equivalent to a cover glass of a reflection type optical disk is disposed between the objective lens 17 and the objective lens 101. The glass plate 1a is parallel to the base 180 of the apparatus.

The following is a description about the measurement of a coma-aberration by using the apparatus of this embodiment.

Referring to FIG. 13, the optical unit 3 having an objective lens 17 is placed on base 180, a laser diode 11 inside the optical unit emits light (shown in FIG. 1), and a laser beam is converted into a convergent beam by the objective lens 17, and enters the measuring apparatus through the glass plate 1a. The beam incident into the apparatus is converted into a parallel beam flux by the objective lens 101, and is divided into two parts by the beam splitter 105, and then, the wave front of the divided beam is rotated relatively by a 180° angle by image rotators 106, 107, and the divided beams are again superposed by the beam splitter 105. Part of the superposed beam is reflected by the prism 152, the mirror 156a, and enters into the TV camera 159 through a condenser lens 157 as shown in FIG. 14. The other part of the superposed beam reaches the image sensor 112 through the imaging lens 111. The imaging lens 111 serves to form the image of the diaphragm 100 into the image sensor 112.

The output of the TV camera 159 and the image sensor 112 is displayed by a CRT monitor (not shown). The output of the TV camera 159 is displayed on the CRT monitor for measurement. Light spots or points showing the positions of the two beam fluxes divided by the beam splitter 105 are displayed on the CRT monitor. Then, the disposing position of the optical unit 3 is adjusted so as to reconcile one light point with the other, and the beam flux from the objective lens 101 is made to coincide with the optical axis thereof.

The display of the output of the image sensor 112 on the CRT monitor shows the wave front aberration of the position of the diaphragm 100 as interference fringes. The observed interference fringes are the component of the difference of the wave fronts of the two divided fluxes relatively rotated by 180° about the optical axis. Thus, the detected wave front aberration is a coma aberration component asymmetrical to the optical axis by an angle of 180°. Neither the defocus component symmetrical to the axis by an angle of 180° nor the astigmatism component asymmetrical to the axis by an angle of 90° are detected as the interference fringes because of offsetting.

If the relative rotation angle by the two image rotators is set at 90°, measurement of astigmatism can be achieved like in the first embodiment.

Figure 15A:
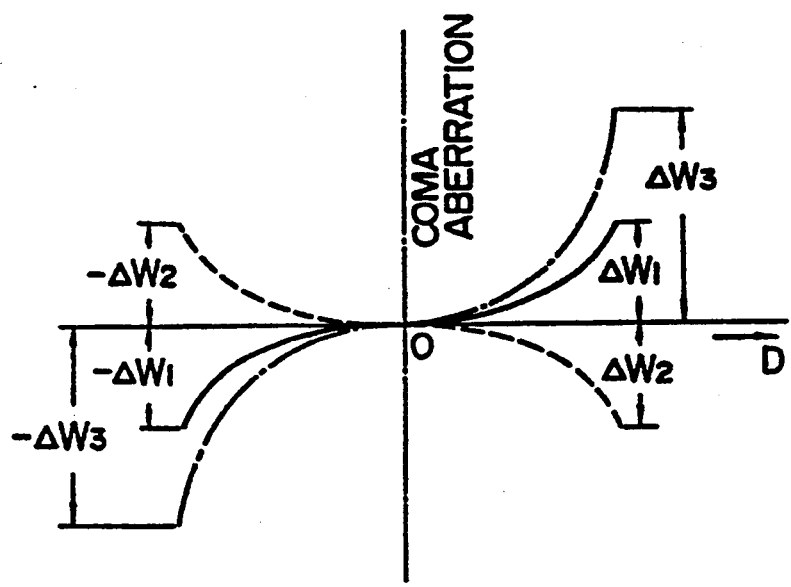
FIG. 15A and 15B are graphs showing the characteristics of a coma aberration.
Figure 15B:
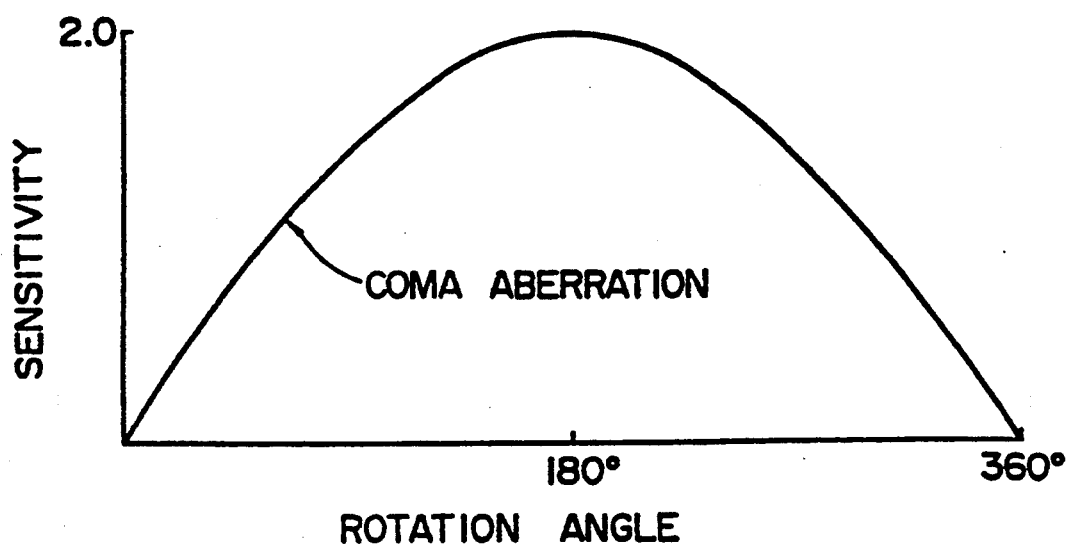

FIG. 15A is a graph showing the amount of the coma aberration on the image sensor according to the distance D from the axis. The solid line ($\Delta W1$) designates the coma aberration of one divided laser beam, and the short dashed line ($\Delta W2$) designates the coma aberration of another divided laser beam. The alternate long and short dashed line ($\Delta W3$) shows a component of the difference between $\Delta W1$ and $\Delta W2$.

The level of $\Delta W3$ is two times the level of $\Delta W1$ as follows:

$$\Delta W3 = \Delta W1 - \Delta W2$$
$$= \Delta W1 - (-\Delta W1)$$
$$= 2\Delta W1$$

FIG. 16B is a graph showing a detection sensitivity of coma aberration according to the rotation angle of the wave front of the beam flux on the optical axis. The component of the coma aberration asymmetrical to the axis by 180° appearing in the interference fringes can be made to have approximately twice the sensitivity by rotating the wave front relatively by 180°.

The inclination of the objective lens 17 is changed so as to minimize the amount of the curve of the interference fringes while the detected interference fringes are being observed. And accordingly, the coma aberration including the coma aberration of the objective lens 17 can be minimized.

Figure 16:
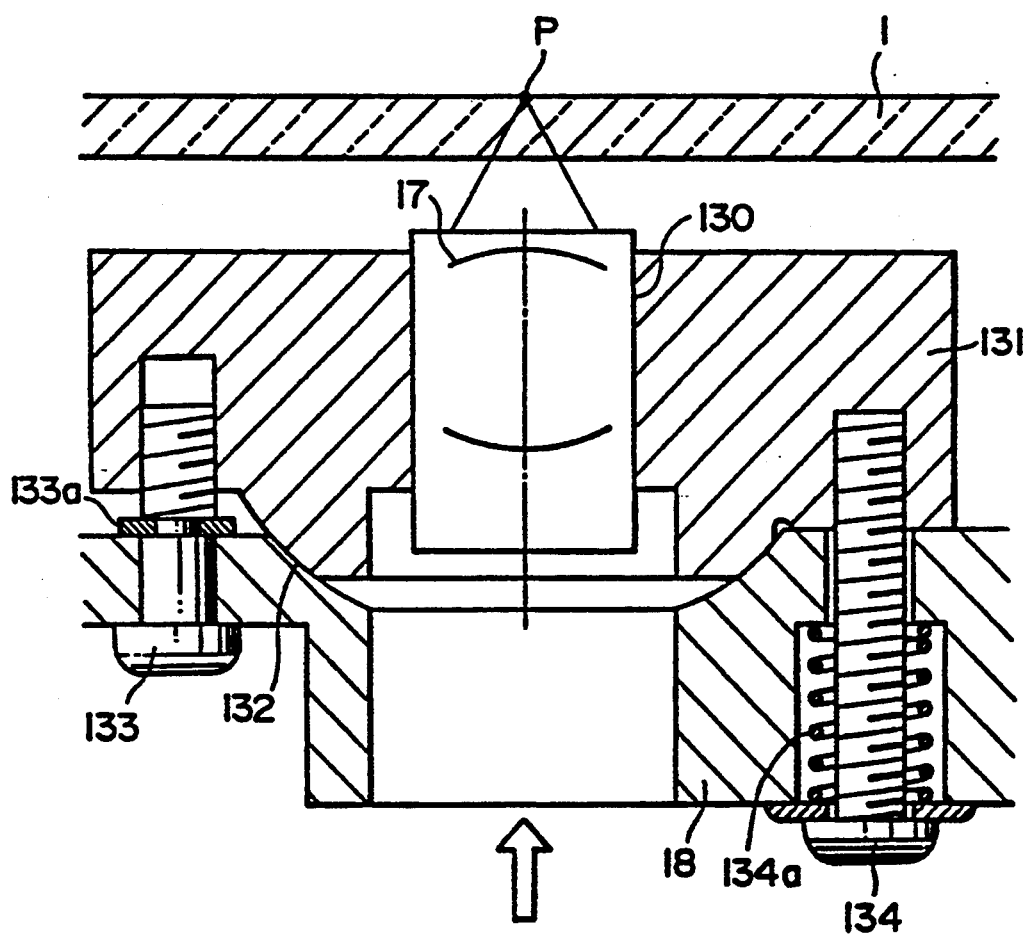
FIG. 16 is a sectional view showing an adjusting mechanism for inclination of an objective lens.
Figure 17:
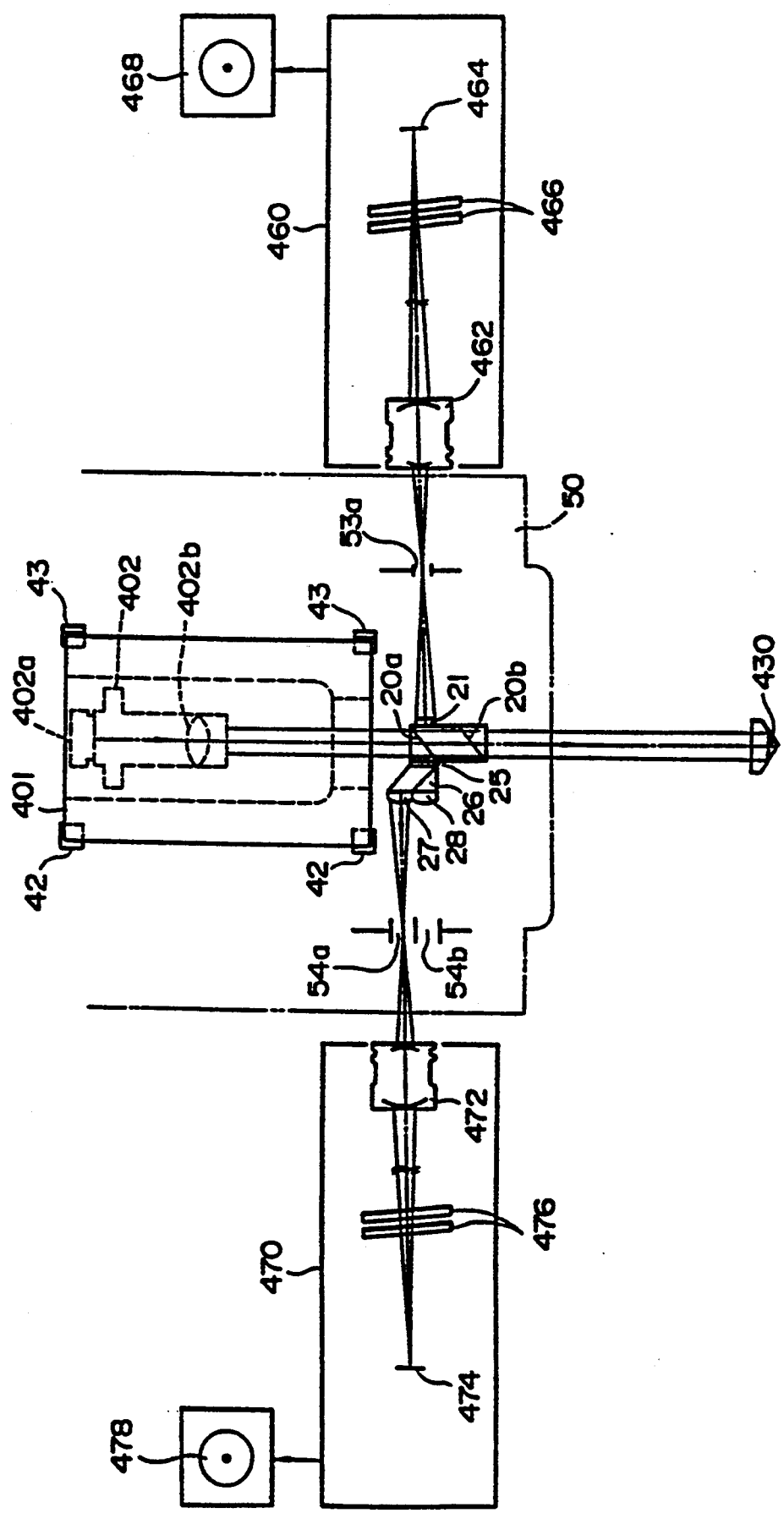
FIG. 17 is a schematic view of an optical system of an apparatus for detecting the inclination of a beam splitter of the device in FIG. 1.

FIG. 16 shows an example of a mechanism for adjusting the inclination of the objective lens 17. A lens frame 130 supporting an objective lens 17 is tiltably fastened to a supporting member 131. The supporting member 131 abuts on a carriage 18 by a spherical base 132 formed on the upside of the carriage 18. The center of curvature of the spherical base 132 is coincident with the convergent point P of the laser beam by the objective lens 17, and the position of the convergent point P is unmovable regardless of movement of the supporting member 131.

The supporting member 131 is fastened to the carriage 18 with two bolts 133, 134. Release of the adjusting bolt 133 from the carriage 18 is prevented by a release preventing ring 133a and is connected with the supporting member 131. The standard bolt 134 connects, via its tip, with the supporting member 131, and is formed with a spring 134a between the carriage 18 and it. The bolt 134 pulls the supporting member 131 toward the carriage 18 side.

The adjusting bolt 133 and the standard bolt 134 are also disposed in positions rotated by a 90° angle on the optical axis of the objective lens. The supporting member 131 is fastened to the carriage 18 with four bolts.

Accordingly, rotation of the adjusting bolt 133 moves the supporting member 131 along the base 132, and adjusts the inclination of the objective lens. The adjusted condition is kept stable by tightening and adjusting bolt 133.

(4) Fourth embodiment

FIGS. 17 through 20 show a fourth embodiment of the present invention.

In the optical system of FIG. 1, the laser beam flux reflected by the magneto-optical disk 1 is divided, each divided laser beam is irradiated onto a light receiving element, and finally the signal is obtained. This type of apparatus can obtain an accurate signal only when the laser beam reaches the light receiving element accurately. In other words, an accurate signal can be obtained by the accurate adjustment and fixation of the position and direction of the beam splitter.

The accurate installation of the beam splitter can be accomplished by a procedure when all optical elements are mounted on the apparatus, a laser diode actually emits, and the laser beam is adjusted on the installation position of the light-receiving element while being detected or observed.

However, the beam splitter is usually fastened with an adhesive hardened by the irradiation of the ultraviolet rays. And the adverse effect of the ultraviolet rays affects the other optical elements.

The conventional adjustment and installation of the beam splitter is carried out with mechanical tools before installing other optical elements.

But the external shape of the beam splitter, the angle of the half mirror surface, etc., are occasionally different from the specifications. And thus, a uniform installation by the mechanical tools produces an inaccurate introduction of the laser beam to the light-receiving element in some parts, such as the half mirror.

An object of the fourth embodiment is to provide a beam splitter-adjusting method, by which the position of the half mirror surface, etc., can be accurately adjusted and the beam splitter is fixed, so as to introduce the laser beam accurately to the light-receiving element before other optical elements are fixed.

Figure 18:
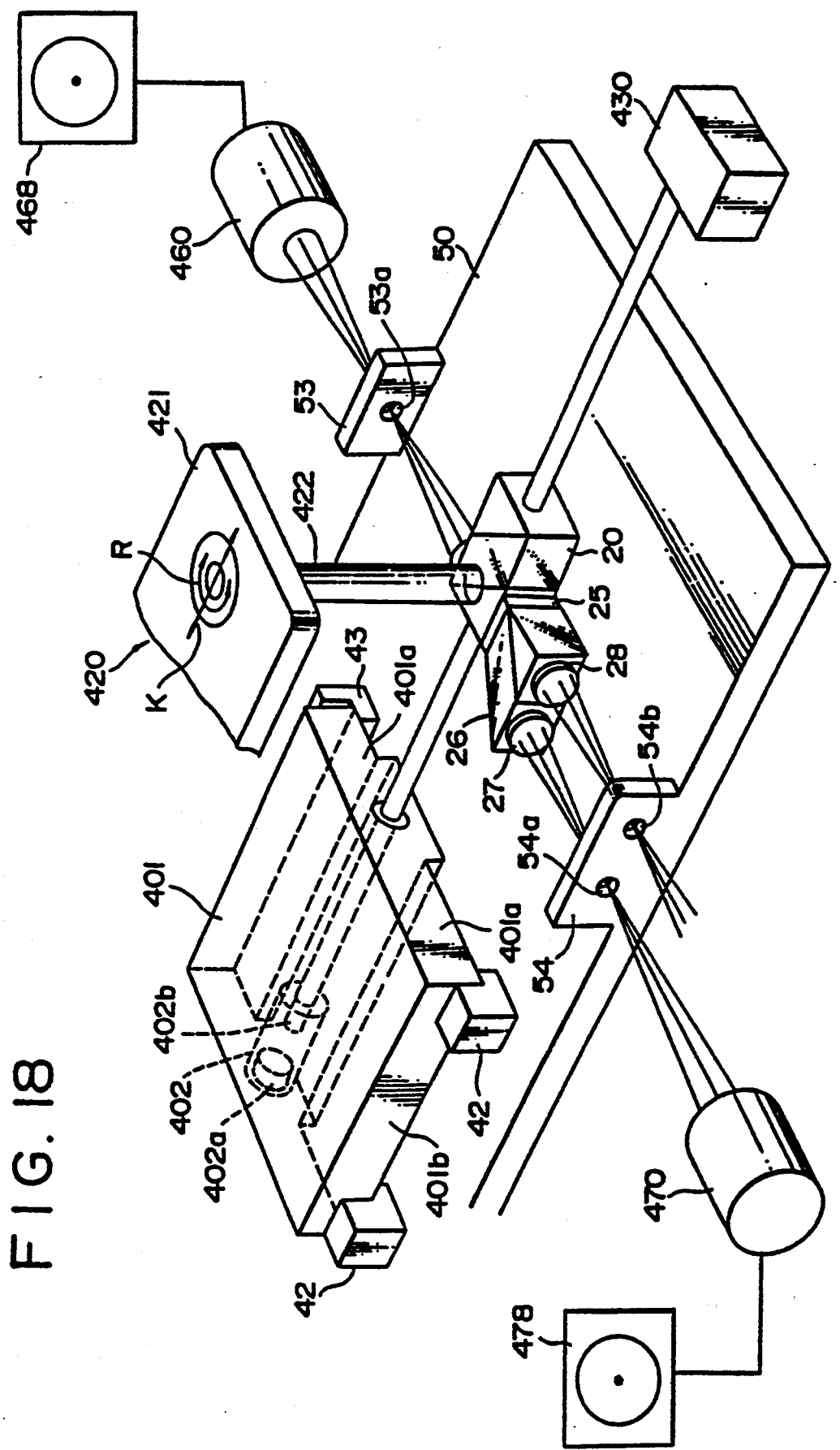
FIG. 18 is a perspective view of the device in FIG. 18.

FIG. 18 shows a configuration for adjusting the beam splitter. 50 designates a base comprising optical elements including a beam splitter 20, and mounts 42, 43 for mounting guide rails 40, 41 (shown in FIG. 2). The base 50 comprises a mounting plate 54 for fixing a first light-receiving element 22 for a laser output monitor, and a mounting plate 54 for fixing second and third light-receiving elements 29, 30 for an S-polarized beam and a P-polarized beam. The plate 53 comprises a fixing hole 53a, and the plate 54 comprises fixing holes 54a, 54b.

Figure 3:
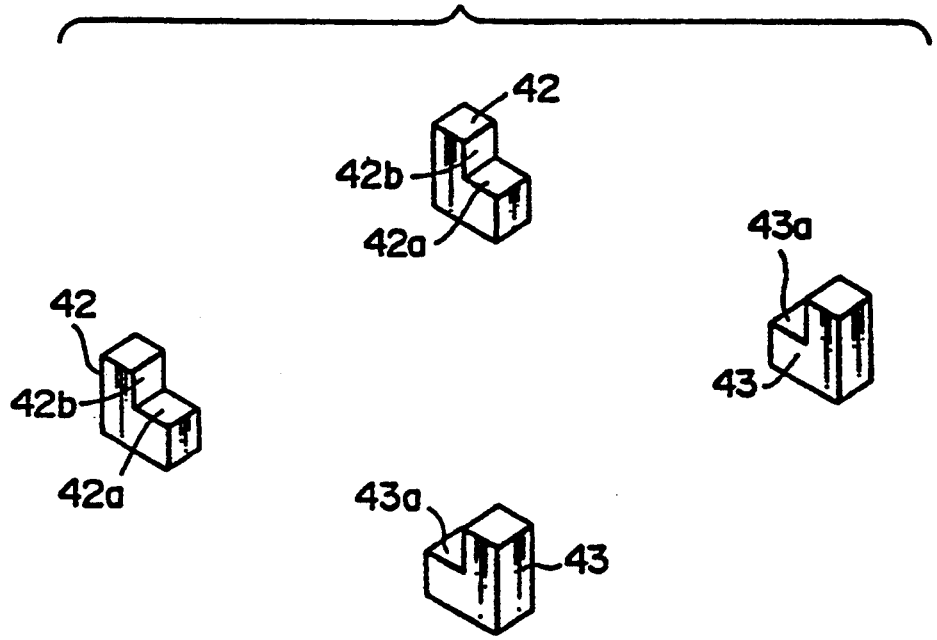
FIG. 3 is a perspective view showing mounts for the guide rails.

The adjustment and fixing of the beam spitter is as follows. A light source portion for adjusting 401 is mounted on he mounts 42, 43 which are fixed on the base 50. For fixing and mounting, the bottom surface 401a of the light source portion for adjusting must be in contact with the horizontal surfaces 42a, 43a (shown in FIG. 3) of the mounts 42, 43 and the side surface 401b of the light source portion 401 must be in contact with the vertical surface 42b of the mounting portion 42.

The light source portion for adjusting 401 comprises a laser pen 402 including a laser diode 402a and a collimator lens 402b. The laser beam emitted from the laser pen 402 is parallel to the bottom surface 401a and the side surface 401b of the light source portion 401.

Therefore, the laser beam from the laser pen 402 becomes parallel to the guide rails which are mounted after measurement, and coincides with the axis of the optical system of the magneto-optical disk apparatus, when the light source portion for adjusting is mounting on the mounted portions 42, 43 for guide rails 40, 41.

A narrow gap is formed between the side surface 501b of the light source portion for adjusting, and the mounting portion 43.

The beam splitter 20 is then mounted on the base. The half wavelength plate 25, the auxiliary beam splitter 26 and the condenser lenses have been previously adhered on the beam splitter 20. An adjusting tool 420, as shown in FIG. 18 is mounted on the top surface of the beam splitter 20. The adjusting tool 420 comprises a handle 421 and a rod 422 connected with the bottom surface of the handle 421. The tip of the rod 422 is mounted on the top surface of the beam splitter 20, and handle 421 is rotated in the direction of arrow R direction about the axis of the rod 422. Accordingly, the half mirror surfaces 20a, 20b of the beam splitter 20 can be rotated and moved within a plane parallel to the base 50.

The half mirror surfaces 20a, 20b are moved parallel to the direction of the optical axis according to the movement of the handle 421 in the arrow K direction along the axis of the laser pen 402.

The laser beam emitted from the laser diode 402a of the laser pen 402 is divided on the half mirror surface 20a of the beam splitter 20. The reflected component is divided into a P-polarized beam and S-polarized beam by the auxiliary beam splitter 26, and then these divided beams become a convergent light beam by condenser lenses 27, 28.

The transmitted component enters to a corner cube 430, after being transmited by the half mirror surface 20b. The corner cube 430 whose vertical point coincides with the axis of the laser pen 420 reflects the beam through the beam splitter 20 in the opposite direction. A part of beam reflected by the corner cube 430 is reflected by the half mirror surface 20a of the beam splitter 20 and changed into a convergent light beam by the condenser lens 21.

The laser beam emerging through the fixing holes 53a, 54a is observed by image pickup devices 460, 470. The image pickup devices 460, 470 comprise objective lenses 462, 472 for forming images of the fixing holes 53a, 54a on the image pick up elements respectively.

Polarizing filters 466, 476, independently rotatable on the axis to adjust the quantity of light, are disposed between the objective lens and the image-receiving element.

The images of the fixing holes 53a, 54a taken by the image pick up devices 460, 470 are displayed on CRT monitors 458, 478 respectively.

Figure 19A:
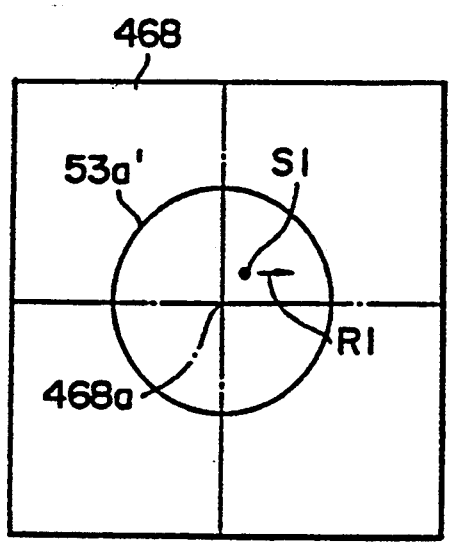
FIG. 19A and 19B are schematic views of a monitor display used in rotating of a beam splitter.
Figure 19B:
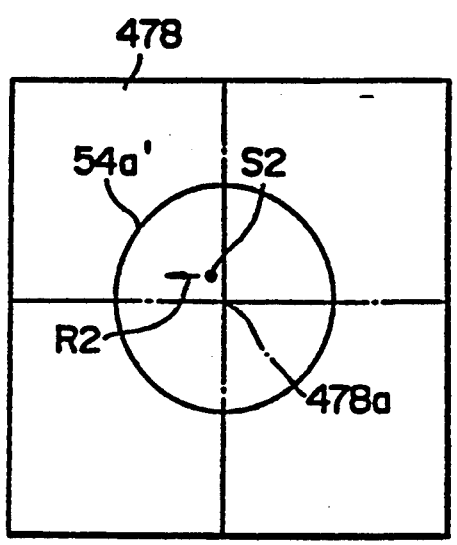

The CRT monitor 468 displays the image 53a' of the fixing hole 53a and the image S1 of the convergent point of the laser beam as shown in FIG. 19A. Similarly, the CRT monitor 468 displays the image 54a of the fixing hole 54a and the image S2 in FIG. 19B.

After displaying the images, the positions and directions of the image pick up devices 460, 470 are adjusted so that the reference points 468a, 478a on each CRT monitor coincide with the centers of the images 53a, 54a. Then, the position of the beam splitter 20 is adjusted so that the images S1, S2 of the convergent points coincide with the reference points respectively. The rotation of the adjusting tool 420 in the arrow R direction produces motions of the images S1, S2 in the R1, R2 directions opposite to each other.

Figure 20A:
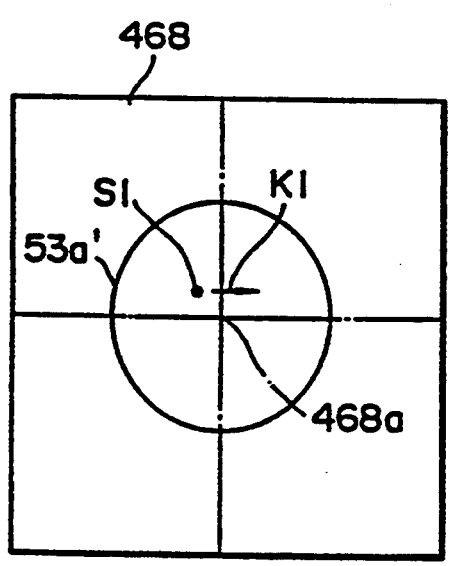
FIG. 20A and 20B are schematic views of a monitor display used in sliding beam splitters.
Figure 20B:
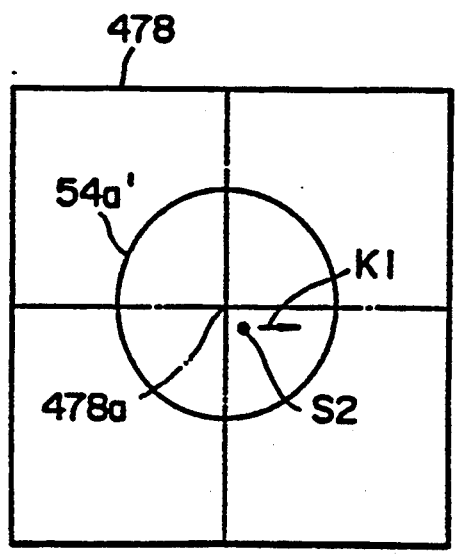

The motions of the adjustable lines in the arrow k direction produces motions of the images S1, S2, as shown in FIGS. 20A, 20B.

And the images S2, S2 are adjusted to coincide with the reference lines by the combination of these motions, and next, the beam splitter 20 is fixed to the base 50 with the adhesive agent by ultraviolet irradiation.

Coincidence between the images S1, S2 and the reference points means that the laser beam from laser pen 402 focuses upon the centers of the fixing holes 53a, 54a.

Therefore, when a optical system of a magneto optical disk apparatus is formed by installing other optical elements, part of the laser beam emitted from the laser diode 11 is focused accurately upon the center of the first light receiving element, and part of the reflected laser beam is focused accurately upon the center of the second light receiving element 29.

The position and direction of the half mirror surface can be adjusted accurately and easily onto the light receiving elements disposed on both sides surrounding the beam splitter, regardless of the outer shape of the beam splitter, according to this embodiment.

An adjustable direction in the above embodiment is that horizontal to the base plane, not that vertical to the plane. Therefore, the beam splitter must be exchanged when the error in the vertical direction exceeds the tolerance.

The mounting portions 42, 43 of the guide rail are utilized for mounting the light source for adjusting 401 in this embodiment. But the disposition of a pin for determining the position, for example, on the reference position of an optical system can be also permitted instead of the above mounting portions 42, 43.

(5) Fifth embodiment

Figure 21:
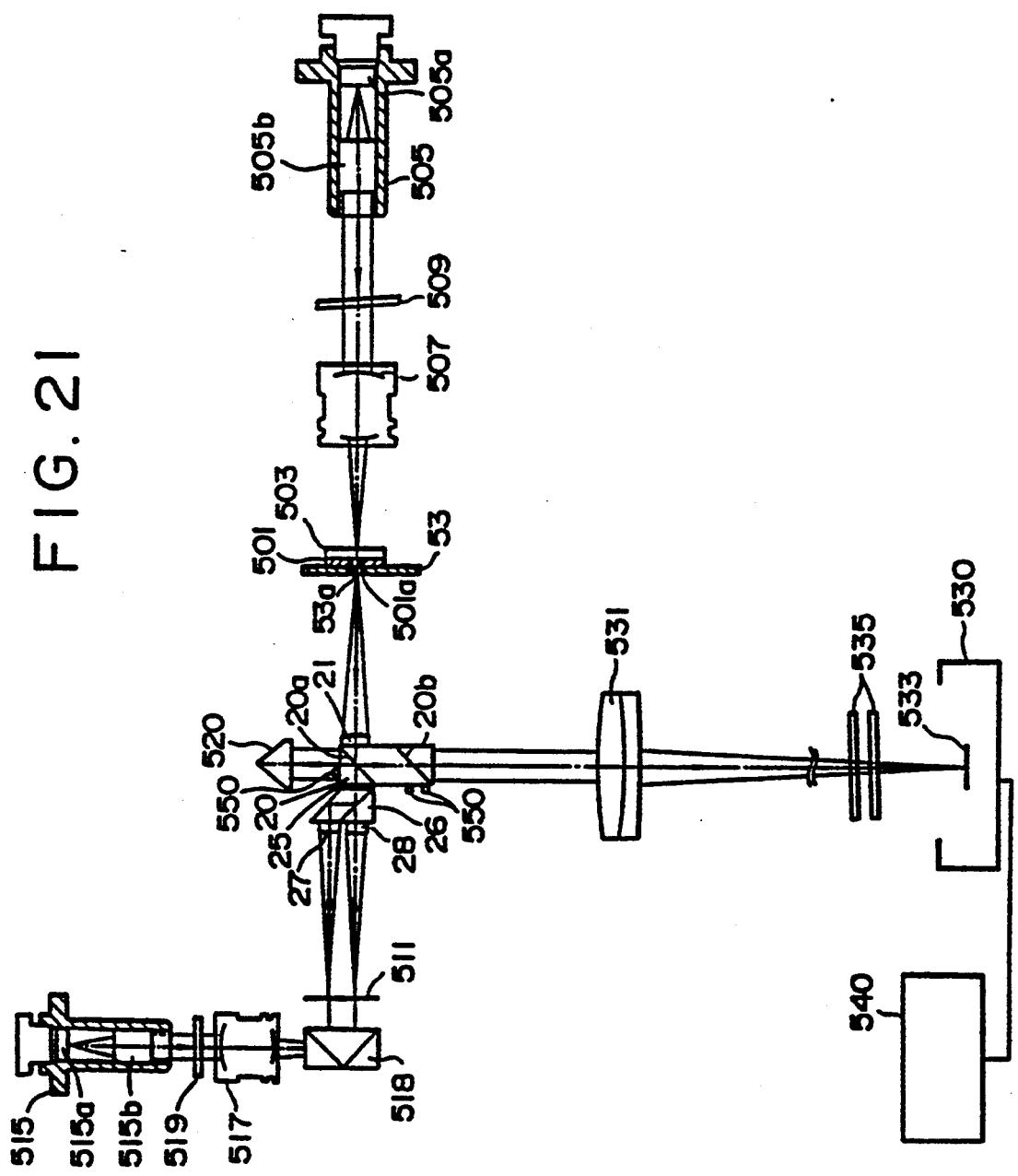
FIG. 21 is a schematic view of an optical system showing a device for inspecting a beam splitter of the device of FIG. 1.
Figure 22:
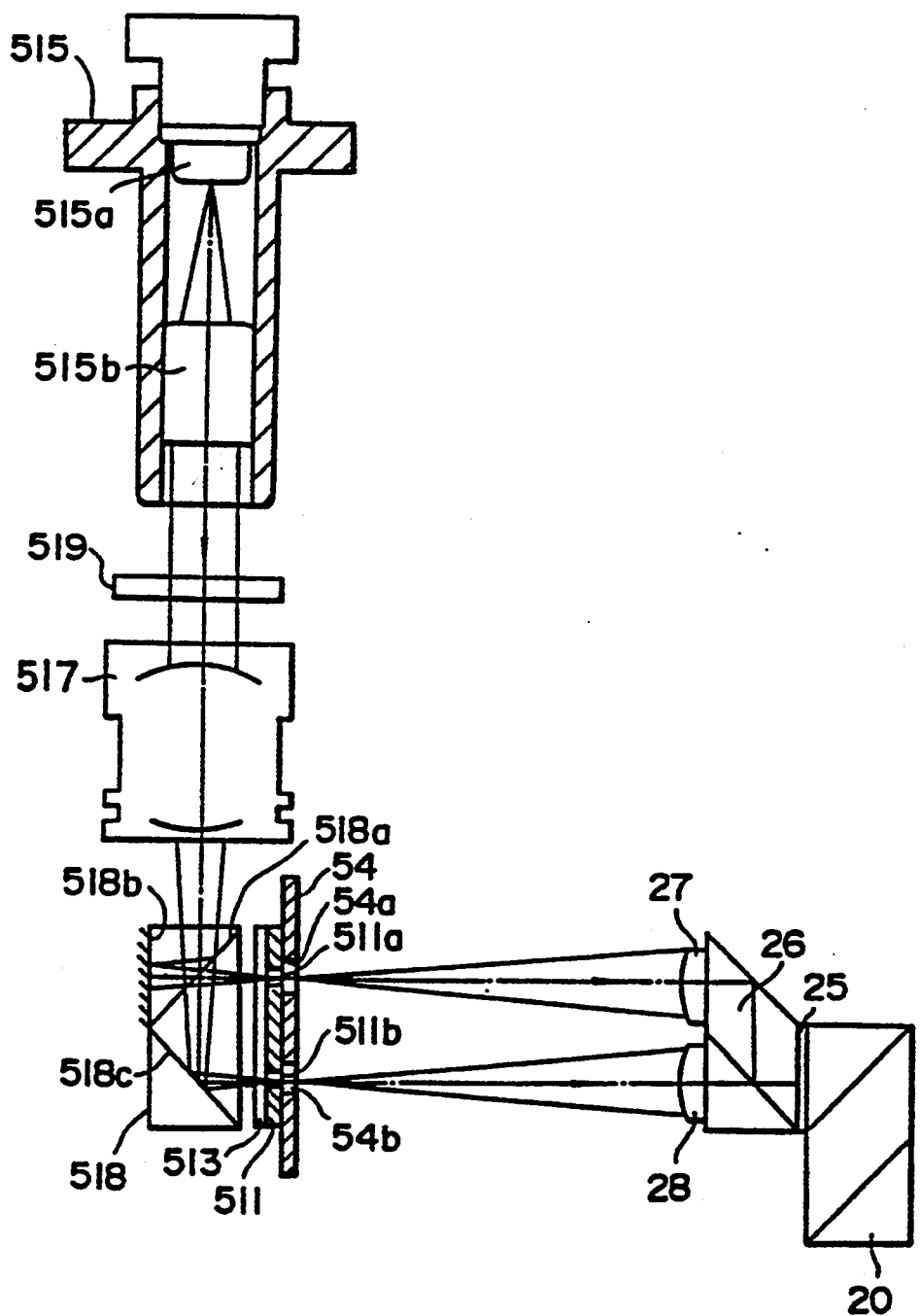
FIG. 22 is an partially enlarged view of the device of FIG. 21.
Figure 23:
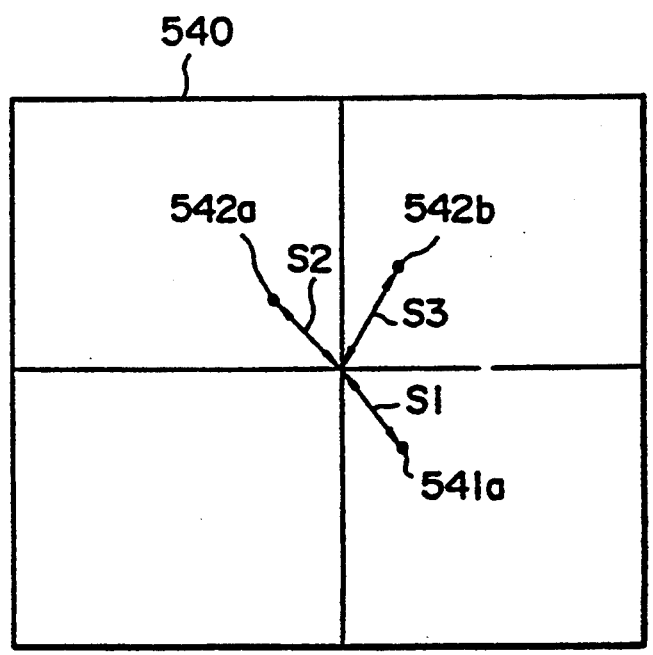
FIG. 23 illustrates a view of a monitor formed by inspecting the device of FIG. 21.

FIGS. 21 through 23 show a fifth embodiment of the prevent invention. This embodiment relates to an apparatus for measuring the laser beam divided by the beam splitter 20, and whether it can accurately enter into each of the light-receiving elements 21, 29 and 30.

In the conventional apparatus, TV cameras are disposed at the positions where the light-receiving element is to be put and the convergent positions are observed by another monitor from the installation position of each light-receiving element.

However, the conventional method requires very high cost because many TV cameras and monitors are needed according to the number of the light-receiving elements. Therefore, the relation of the difference among each convergent position can not be observed on a screen of the monitor.

An object of the fifth embodiment is to provide an apparatus for eliminating the above deficiencies, for accomplishing this object at a low cost by the simplification of the apparatus, and for observing the dislocation of each convergent position, for example, on the same image surface.

Referring to FIG. 21 and the partially enlarged FIG. 22, a measuring apparatus for making incident each beam emitted from the laser pens 505, 515 from the fixing holes 53a, 54a, 54b (see FIG. 18), for mounting the light-receiving elements to the beam splitter 20, superposing these beams and observing then by a single TV camera 530 is provided. The beam splitter 20 is disposed on the reference position by a positioning pin 550.

A diaphragm plate 501 including a pin hole 501a of the first chart is disposed on the incident side of the fixing plate 53. A ground glass is further disposed on the incident side of the plate 53. The diaphragm plate 501 is so disposed that the center of the pin hole 501a may coincide with the center of the fixing hole 53a. The ground glass serves to illuminate the pin hole 501a uniformly.

Referring to FIG. 22, a diaphragm plate 511 including pin holes 511a, 511b, and a ground glass 513 are disposed on the fixing plate 54 in a same order as on the fixing plate 53. The centers of the pin holes 511a, 511b coincide with those of the fixing holes 54a and 54b.

Laser pens 505, 515 comprise laser diode 505a, 515a and collimator lens 505b, 515b respectively, and emit a parallel laser beam.

The laser beam emitted from the laser pen 505 passes through a ND filter 508, and is focused on the pin hole 501a by a condenser lens 507 and ground glass 503. The pin hole 501a is a point source. The laser beam emitted from the point source is converted into a parallel beam through the lens. A part of the parallel beam is reflected by the first half mirror surface 20a of the beam splitter 20, and then enters a TV camera 530 after being transmitted by the second half mirror surface 20b.

The laser beam emitted from another laser pen 515 enters into the beam splitter 518 through a half wavelength plate 519 and a condenser lens 517, and is divided into two beams. The half wavelength plate 519 is disposed rotatably on the optical axis for adjusting the plane of the polarization of the laser beam.

The laser beam made incident into the beam splitter 518 is divided by the first half mirror surface 518a and the reflected beam is again reflected by the mirror surface 518b and condensed into the position of the second pin hole 511a.

The laser beam transmitted by the half mirror surface 518 is reflected by the mirror 518c, and condensed into the third pin hole 511b. The laser beams from the two pin holes are converted into parallel beams through the condenser lenses 27, 28, and then superposed by the auxiliary beam splitter 26. A part of the superposed beam is reflected by the half mirror surface 20a. The laser beam from the beam splitter 10 is reflected in the opposite direction by the corner cube 520, and again enters into the beam splitter 20. The component passing through the half mirror surface 20a, 20b proceeds toward the TV camera 530.

Thus, the beam splitter 20 emits three types of laser beams entering from different positions respectively toward the TV camera. These three laser beams are imaged on an image receiving surface 533 of the TV camera 530 by the objective lens 531 and forms the image of the point surface. Accordingly, the output of the TV camera 530 displayed on the monitor 540 shows three indexes 541a, 542a, 542b as in FIG. 23.

No error of the finish of the beam splitter 20 and the auxiliary beam splitter 26 is displayed by the coincidence of the three point-images (541a, 541a, 641b) in the center of the monitor 540.

When the fixing position of the condenser lens 27 has an error with respect to the auxiliary beam splitter 26, the amount S of the dislocation of the convergent points on the image receiving surface 533 is $$S = f2 \cdot D / f1$$

where f1 is a focal length of the condenser lens 27, f2 is a focal length of the objective lens 531, D is a displacement between the focal point of the condenser lens 27 and the center of the pin hole 511a.

Therefore, the fixing errors of the condenser lenses 21, 27, 28 or the accuracy of the finish of the beam splitter 20 and the auxiliary beam splitter 26 can be measured by the above formula, where S is obtained by measuring the lengths S1, S2, S3 from the center of the monitor divided by the magnification of the monitor.

Changing the focal length f2 of the objective lens 531 increases or lessens the amount S of the displacement of the points (S1, S2, S3), and accordingly can change the sensitivity for detecting. Simultaneously observing of each spot in this embodiment can change the respective observing of each spot emitted by the laser beam from the laser pens 505, 515 selectively.

What is claimed is:

1. A method for adjusting a beam splitter for separating a laser light beam emitted by a laser light source and reflected by an optical disk comprising the steps of:
    setting a supplemental laser source, distinct from the laser light source, on a mechanism which transfers an objective optical system along a radial direction of the optical disk so that a laser light beam from said supplemental laser source is incident to the beam splitter; and
    adjusting the beam splitter while observing a position of split laser light from said beam splitter at plural points where the laser light will be detected.

2. The method of adjusting a beam splitter according to claim 1, further comprising the step of providing a base for holding optical elements, a light source for emitting a laser light beam, an objective optical system for imaging the laser light beam onto an optical disk, and a beam splitter adjustably mounted on the base for splitting the laser light beam.

3. The method for adjusting a beam splitter according to claim 2, further comprising the step of providing a guide rail mechanism for transferring the objective optical system, and photodetectors for detecting the laser light beam split by the beam splitter.

4. The method of adjusting a beam splitter according to claim 2, wherein the beam splitter splits the laser light beam in a predetermined plane, and further comprising the step of mounting the beam splitter for adjustment in the predetermined plane.

5. The method of adjusting a beam splitter according to claim 4, further comprising the step of enabling the beam splitter to rotate and to move in the predetermined plane.

6. The method of adjusting a beam splitter of an optical information recording/reproducing apparatus that has a laser light source, an objective optical system for converging the light beam from the laser light source, a guide rail mechanism for transferring the objective optical system, a beam splitter mounted in an optical path of the light beam that is parallel to the transferring direction, and photodetectors for detecting the light beam split by the beam splitter, comprising the steps of:
    setting a supplemental laser source, distinct from the laser light source, for emitting a supplemental laser beam onto the guide rail mechanism so that the supplemental laser beam is incident onto the beam splitter along the optical path; and
    adjusting the beam splitter, while observing the position of the split laser beam from the beam splitter at plural points where the photodetectors are to be mounted.

7. A method for adjusting a beam splitter of an optical disk apparatus, including a laser light source, comprising the steps of:
    setting a light source portion for adjustment so that the light beam emitted from the light source portion for adjustment is incident onto a beam splitter along an optical path of a light beam reflected from an optical disk, said light source portion for adjustment being distinct from the laser light source; and
    adjusting the beam splitter, while observing a position of the light beam split by the beam splitter at a point where the light beam is to be detected.

8. The method of adjusting a beam splitter according to claim 7, further comprising the step of:
    setting a reflecting member for reflecting the light beam emitted from the light source portion for adjustment and passing through the beam splitter so that the light beam reflected by the reflecting member is again made incident onto the beam splitter.

9. The method of adjusting a beam splitter according to claim 8, wherein the beam splitter reflects the light beam from the light source for adjustment portion towards a first detecting point and reflects the light beam reflected by the reflecting member towards a second detecting point.

10. The method of adjusting a beam splitter according to claim 7, further comprising the step of utilizing an image detecting device for observing the light beam split by the beam splitter, by an imaging lens of the image detecting device.

11. A method for adjusting a beam splitter of an optical information recording/reproducing apparatus that has a laser light source, an objective optical system for converging a light beam from the laser light source, a guide rail mechanism for transferring the objective optical system, a beam splitter mounted in an optical path of the light beam that is parallel to the transferring direction, and photodetectors for detecting the light beam split by the beam splitter, said method comprising:
    providing a light source portion for adjusting, that is detachably positioned on the guide rail mechanism so that a laser beam emitted from said light source portion for adjusting is incident onto the beam splitter along the optical path, said light source portion for adjusting being distinct from the laser light source.

12. The method for adjusting the beam splitter according to claim 11, the step of providing a light source portion for adjusting comprises providing a laser pen including a laser diode and a collimator lens.

* * * * *

UNITED STATES PATENT AND TRADEMARK OFFICE
CERTIFICATE OF CORRECTION

PATENT NO. : 5,410,532
DATED : April 25, 1995
INVENTOR(S) : M. OONO et al.

It is certified that error appears in the above-indentified patent and that said Letters Patent is hereby corrected as shown below:

On the title page, in section [19], line 2, change "Ohno et al." to ---Oono et al---.

On the title page, in section [54], "Title" line 1, delete "A" (first occurrence).

On the title page, in section [75], "Inventors", line 1, change "Ono;" to ---Oono;---.

On the title page, in section [75], "Inventors", line 1, change "Itoho;" to ---Itoh;---.

At column 18, line 14 (claim 9, line 3), change "for adjustment portion" to ---portion for adjustment---.

Signed and Sealed this

Twenty-fourth Day of December, 1996

Attest:

BRUCE LEHMAN

*Attesting Officer*  *Commissioner of Patents and Trademarks*